US006973625B1

(12) United States Patent
Lupo et al.

(10) Patent No.: US 6,973,625 B1
(45) Date of Patent: Dec. 6, 2005

(54) METHOD FOR CREATING BROWSER-BASED USER INTERFACE APPLICATIONS USING A FRAMEWORK

(75) Inventors: Joseph Paul Lupo, Apopka, FL (US); Stephen DeWayne Weagraff, Orlando, FL (US); Thomas Byron Dean, New Richmond, OH (US); Michael Daniel Sauer, Cleves, OH (US)

(73) Assignee: Convergys CMG Utah, South Jordan, UT (US)

( * ) Notice: Subject to any disclaimer, the term of this patent is extended or adjusted under 35 U.S.C. 154(b) by 544 days.

(21) Appl. No.: 10/127,042

(22) Filed: Apr. 19, 2002

Related U.S. Application Data

(60) Provisional application No. 60/303,427, filed on Jul. 6, 2001.

(51) Int. Cl.[7] .................................................. G06F 3/00
(52) U.S. Cl. ...................................... 715/762; 715/744
(58) Field of Search ................................ 715/762, 764, 715/700, 744; 707/1, 103 R; 717/101; 705/26; 713/200; 709/231, 330; 719/330, 320, 319, 719/316

(56) References Cited

U.S. PATENT DOCUMENTS

| 5,870,550 | A | 2/1999 | Wesinger, Jr. et al. |
| 5,908,469 | A | 6/1999 | Botz et al. |
| 5,928,323 | A | 7/1999 | Gosling et al. |
| 5,953,731 | A | 9/1999 | Glaser |
| 5,956,736 | A | 9/1999 | Hanson et al. |
| 5,991,877 | A | 11/1999 | Luckenbaugh |
| 6,012,098 | A | 1/2000 | Bayeh et al. |
| 6,014,637 | A | 1/2000 | Fell et al. |
| 6,016,495 | A | 1/2000 | McKeehan et al. |
| 6,047,324 | A | 4/2000 | Ford et al. |
| 6,049,664 | A | 4/2000 | Dale et al. |
| 6,085,030 | A | 7/2000 | Whitehead et al. |
| 6,085,233 | A | 7/2000 | Jeffrey et al. |
| 6,100,891 | A | * 8/2000 | Thorne ........................ 715/854 |
| 6,145,119 | A | 11/2000 | House et al. |
| 6,163,878 | A | 12/2000 | Kohl |
| 6,266,708 | B1 | 7/2001 | Austvold et al. |
| 6,289,382 | B1 | * 9/2001 | Bowman-Amuah ......... 709/226 |
| 6,496,202 | B1 | * 12/2002 | Prinzing ...................... 715/762 |
| 6,760,912 | B1 | * 7/2004 | Yarsa et al. .................. 719/315 |
| 2002/0065879 | A1 | * 5/2002 | Ambrose et al. ........... 709/203 |
| 2003/0070004 | A1 | * 4/2003 | Mukundan et al. ......... 709/330 |

OTHER PUBLICATIONS

Betz, K, Developing highly- responsive user interfaces with DHTML and Servlets, Feb. 2000 Performance, Computing and Communications Confernce. IPCCC '00, pp 437-443.*
Todd Abel, Microsoft 2000: Create Dynamic Digital Dashboards using office, olap and DHTML, Jul. 2000, MSDN Magazine, pp 1-19.*
IVR Technologies, End User Web Interface Brochure, Jan. 10, 2000, www.ivr.com, pp 1-4.*
Adrian Kingsley-Hughes, Kathie Kingsley-Hughes, "JavaScript 1.5 by example", Jan. 19, 2001, Safari Books Online, pp1-23.*
Sitraka Software Inc, JClass Field, Apr. 13, 2001, pp 1-3.*

(Continued)

*Primary Examiner*—Ba Huynh
*Assistant Examiner*—Steven Theriault
(74) *Attorney, Agent, or Firm*—Frost Brown Todd LLC

(57) ABSTRACT

A framework and method of programming web-based interfaces using management classes for the management of behavior regarding specific web elements wherein said code relating to said management classes is loaded into a user's browser and primarily executed within the client-side browser environment.

39 Claims, 16 Drawing Sheets

OTHER PUBLICATIONS

Tom Negrino, Dori Smith, JavaScript for the World Wide Web, 4th edition: Visual QuickStart guide, Apr. 26, 2001, Peachpit Press, Chapters 2, 10, 15.* www.Siebel.com, Setting the standard for web clients: Siebel 7's Smart Web Architecture, Dec. 2001, pp 1-21.*

Xiaoping Jia et al, "Object Oriented Software Development Using Java", 2000 Addison- Wesley.*

Veikko Punkka et al, "Intelligent Reusable User Interface Components" 1995 Nokia Cellular Systems pp 201-215.*

Ship, Howard, et al. "Build Featuer-Rich World-Class Web Applications", Jun. 2000 Java Report pp. 38, 40, 42, 44, 46, 48.*

NexusEdge.com et al. "Facado", May 2001□□http://web.archive.org/web/20010502223016/www.nexusedge.com/site.html*

Using the Web Component Version 8.0, Template Software, Inc., 1997, Chapter 1-3.

Son, et al, A Component-based Client/Server Application Development Environment using Java, Proceedings of TOOLS 28 on Technology of Object-Oriented Languages, 1998, pp. 168-179.

Chunlin, L., A Java-based Method for Developing Web Application System, Fifth Asia-Pacific Conference APCC/OECC '99, vol. 2, 1999, Figs. 1-4, pp. 1079-1082.

Appendix A, UltraDev for Drumbeat Users (pp. 131-155).

Java Server Page—a searchSolaris definition; http://searchsolaris.techtarget.com/sDefinition/0,,sid12_gci214048,00.html; Jan. 31, 2002; (1 pg.).

Inside the Java Web Server; http://java.sun.com/features/1997/aug/jws1.html; Jan. 31, 2002; (9 pgs.).

Cascading Style Sheets; http://www.htmlhelp.com/reference/css; 1997; (7 pgs.).

Cascading Style Sheets; http://wdvl.com/Authoring/Style/Sheets; 2002 (3 pgs.).

Allsop, John; The Complete CSS Guide; Cascading Style Sheets: CSS1, CSS2 Tutorials, Resources, Help; http://www.westciv.com/style_master/academy/css_tutorial/index.html; 1997-2002 (7 pgs.).

Lead Story; http://www-106.ibm.com/developerworks/features/framework/framework.html; 1999 (13 pgs.).

Robust Web Site Builders; http://www.zdnet.com/devhead/stories/articles/0,4413,388904,00.html; 2001 (29 pgs.).

IBM WebSphere software platform; http://www-4-ibm.com/cgi-bin/soft . . . /index.html&S_TACT=100AWW30&S_CMP=campai 1995-2001 (5 pgs.).

IBM WebSphere Studio—The Ultimate Development Environment; http://www.7b.boulder.ibm.com/wsd/library/techarticles/0108_studio/studio_beta.html; 2001 (12 pgs.).

Macromedia—Press room: Macromedia Ships Drumbeat 2000 http://www.macromedia.com/macromedia/proom/pr/1999/drumbeat/2000.html; 1999 (2 pgs.).

WebControl Class http://www.msdn.microsoft.com/library/en-us/cpref/html/frlrfsystemwebuiwebcontrolsweb . . . 2001 (24 pgs).

Microsoft Visual Studio.Net http://msdn.microsoft.com/vstudio/nextgen/technology/formsdefault.asp; Jun. 25, 2001 (27 pgs.).

Gunther, Harvey W.; IBM WebSphere Application Server Standard and Advanced Editions: WebSphere Application Server Development best Practices for Performance and Scalability; Sep. 7, 2000 (46 pgs.).

IBM Corporation; Leveraging WebSphere technology to design, develop and deploy extensible Web application tools; May, 2001 (17 pgs.).

Friedl, Jeffrey E.F., O'Reily & Associates, Inc., Mastering Regular Expressions; 1997 (reference not included herein).

Champeon, Steve and David S. Fox; Building Dynamic HTML GUIs. IDG Books Worldwide (pp. 187-232) (reference not included herein).

Gilorien; DHTML & Javascript; Prentice Hall; 200 (pp. 1-126) (reference not included herein).

Ship, Howard, Build Feature-Rich, World Class Web Applications, Java Report, Jun. 2000 (6 pgs).

Malks, Dan, JSP and Servlets: A powerful pair, The Architect's Corner, Java Report, Nov., 1999 (4 pgs.).

Anderson, Joel and Kunicki, Chris More Real World Cross-Browser HTML Development, WebTechniques Magazine, Aug. 2000, http:/www.newarchitectmag.com/archives/2000/08/kunicki/.

Johnson, Steve, Building Components in JavaScript, WebTechniques Magazine, Nov. 1999, http:www.newarchitectmag.com/documents/s=5408/new101637455/.

Johnson, Steve, Building Components in JavaScript, WebTechniques Magazine, Nov. 1999, http:www.newarchitectmag.com/documents/s=5408/new101637455/2.1st.

Johnson, Steve, Building Components in JavaScript, WebTechniques Magazine, Nov. 1999, http:www.newarchitectmag.com/documents/s=5408/new101637455/3.1st.

DynAPI: Cross-Browser DHTML Library (Cross-browser javascript library which contained some global variable ideas integrated into CBF), http://dynapi.sourceforge.net/dynapi/.

Code and functions to handle cookie functionality: Bill Dortch at hIdaho Design (bdorch@hidaho.com) has the most comprehensive set of functions for cookie management from the Client. All of his functions can be found at http://www.hidaho.com/cookies/cookie.txt (Cite not available at this time).

* cited by examiner

| Component | Shadow Object | HTML Code | HTML Components Shadowed |
|---|---|---|---|
| Text Box | BFtext | `<input type="text" name="zip5" size="5" maxlength="5" Browser Frameworkclass="Browser Frameworktext">` | Shadows the <INPUT> text box and <INPUT> password text box components. |
| Push Button | BFbutton | `<input type="button" name="OK" value="OK" Browser Frameworkclass="Browser Frameworkbutton">` | Shadows the <INPUT> button, <INPUT> submit, <INPUT> reset, <INPUT> check box, and <INPUT> radio button components. |
| List Box | BFselect | `<select name="Sample8Select" Browser Frameworkclass="Browser Frameworkselect" multiple size="5">` | Shadows the <SELECT> list box component. |
| Table | BFtable | `<table width="75%" border="1" name="SampleTable" Browser Frameworkclass="Browser Frameworktable">` | Shadows the <TABLE> component. |
|  | BFtabbg |  | Shadows the <DIV> component when used with the BF tab control. |
|  | BFtablabel |  | Shadows the <DIV> component when used with the BF tab control. |
|  | BFtabpane |  | Shadows the <DIV> component when used with the BF tab control. |

Figure 15

| BF Attributes | BF Shadow Objects ||||||||
|---|---|---|---|---|---|---|---|
| | BF worktext | BF workbutton | BF select | BF table | BF tabbg | BF tab-label | BF tabpane |
| BFhelpfile | x | x | x | x | x | x | x |
| BFfalse-behavior | x | x | x | x | x | x | x |
| BFtrue-behavior | x | x | x | x | x | x | x |
| BFgtrue-behavior | x | x | x | x | x | x | x |
| BFvalidator | x | x | x | x | x | x | x |
| BFvalidate-errorfn | x | x | x | x | x | x | x |
| BFsubject-grp | x | x | x | x | x | x | x |
| BFobservergrp | x | x | x | x | x | x | x |
| BFrequired | x | x | x | x | x | x | x |
| BFmodal | x | | | | | | |
| BFsortmethod | | | x | | | | |
| BFselectfn | | | x | | | | |
| BFprotocol | | | | x | | | |
| BFtab | | | | | x | x | x |
| BFdefault | | | | | | x | x |
| BFmulti-select | | | | x | | | |
| BFhilite-color | | | | x | | | |

Figure 16

| | |
|---|---|
| FixNum1 ... FixedNum18 | A fixed number of numeric integers (1 to 18). |
| VarNum1 ... VarNum18 | Numeric integer text that can be any number of digits from 1 to the specified maximum. |
| VarFloat, VarSignedFloat, VarFloatDec2 | Numeric decimal text that is variable in length, with both the number of digits and the decimal places varying; also decimal numbers preceded by a plus (+) or minus (-) sign; also numbers with two decimal places. |
| VarInt, VarSignedInt | Numeric integer text that is variable in length and preceded by a plus (+) or minus (-) sign. |
| Alpha1 ... Alpha18 | A fixed number of alphabetic characters (1 to 18). |
| VarAlpha1 ... VarAlpha18 | Alphabetic text that is any number of characters from 1 to the specified maximum. |
| AlphaNum1 ... AlphaNum18 | A fixed number of alphanumeric characters (1 to 18). |
| VarAlphaNum1 ... VarAlphaNum18 | Alphanumeric text that is any number of characters from 1 to the specified maximum. |
| NotEmpty | Presence of some text input; default ValidatorData object of any HTML component that has a shadow object of BFtext (<TEXTAREA> and <INPUT> text and password boxes). |
| USPhone | 10-digit American telephone number (NPA, NXX, and Line); also masks the text box so that punctuation displays: (999) 999-9999. |
| USSSN | 9-digit American Social Security Number with mask so that hyphens display: 999-99-9999. |
| Email | Text format matches required format for an e-mail address; object does not validate that the e-mail address itself is valid. |
| IPAddr | Text format matches a required IP address (each of the four numeric values must be a number between 0 and 255, inclusive). |
| DYYY, DDMMYYYY, MMYYYY, DYY, MMYY, YYYYMMDD, /DDMM, DDMonYYYY, MonDDYYYY | Date format matches the specified format. Masking for correct punctuation is not provided. |
| Table | Validates the number of *selected* rows in a <TABLE> object or the total number of rows in the table; this is the default ValidatorData object for the <TABLE> component. |
| Select | Validates the number of *selected* items in a <SELECT> list box or the total items in the list box; this is the default ValidatorData object for the <TABLE> component. |
| Form | Validates each component belonging to the form; the default ValidatorData object for the <FORM> component. |

Figure 17

METHOD FOR CREATING BROWSER-BASED USER INTERFACE APPLICATIONS USING A FRAMEWORK

PREAMBLE

This application is based upon, claims priority from, and incorporates by reference the entirety of the provisional application Ser. No. 60/303,427, Lupo, et al, filed Jul. 6, 2001.

FIELD OF INVENTION

This invention relates to development frameworks for web-based user interfaces.

BACKGROUND

Code reuse is the goal of many a computer project whether it is coded in an objected-oriented programming (OOP) language (including, but not limited to, Java, C++, and C#) or a more structured language (including, but not limited to, COBOL and C). Complementary to the goal of code reuse is the goal of standardizing code (also known as plug-and-play). These goals may be achieved through a combination of OOP principles such as encapsulation, inheritance, abstract classes and polymorphism, composition, interfaces, implementation, frameworks, and contracts. The treatise, *The Object-Oriented Thought Process*, Sams Publishing 2000, by Matt Weisfeld, provides an excellent explanation of these concepts, however, some of these terms may have multiple meanings depending on the context in which they are used.

The following provides background on these principles. It is, however, expected that these principles are well understood by those skilled in the art. Classes are blueprints of the methods and variables in an object. Objects are instantiations of a class; they contain real values.

Classes and objects are two of the defining ideas of object-oriented programming. Classes may provide for the implementation of methods contained in the class or the implementation may be provided by or overridden by the object instantiation of that class. Objects may encapsulate their methods and/or attributes to hide them from end users of the framework. In general, an attribute is a property or characteristic. In the Hypertext Markup Language (HTML), an attribute is a characteristic of a page element, such as a font. This also makes code design easier for such developers because they do not have to understand the entire system to create an application. The developer communicates with a given object through an interface provided by that object. Class types include super-classes, classes, and sub-classes. A class can have subclasses that can inherit all or some of the characteristics of the class. In relation to each subclass, the class becomes the superclass. Subclasses can also define their own methods and variables that are not part of their superclass. The structure of a class and its subclasses is called the class hierarchy. Class types also include abstract classes, which are class blueprints that do not contain any implementation of one or more of its methods. Such abstract classes may be overridden when instantiated according to the OOP principle known as polymorphism. It is possible for an instantiation of an object to be composed of multiple object instantiations (composition).

Frameworks may be utilized by developers through application programming interfaces (API) when developing computer programs. APIs are the publicly revealed methods and attributes of a given computer system. Frameworks comprise a contract of classes (the API) designed to achieve an objective. These classes may be encoded on a computer readable medium and manipulated/arranged to create an application. To use a framework, a developer must use the predetermined interface (which may be extensible) to create an application. A contract is any mechanism that requires a developer to comply with the specifications provided by the API of a particular framework. For instance, if a developer creates rogue code, the "computer executable instructions encoded on a computer readable medium" (also, software, code, and program) may not compile and the code will be useless. Another type of interface is used in OOP, particularly in Java or Java-like languages, which may not allow for multiple inheritance. Such interfaces are a method of specifying behavior for multiple, unrelated classes/objects to enforce contracts. It also provides an alternative to an ungainly, multiple-level inheritance architecture. A given class may implement an interface to extend its functionality.

Web Developers use OOP principles to develop applications organized around objects rather than functions. These methodologies, when used correctly, provide simple, standard interfaces for objects, which are known in the art as "black boxes". A first step in designing such a system involves identifying all the objects to be manipulated and determining how they relate to each other (data modeling). Once an object has been identified, its data elements and functions may be generalized as a base class. Additional functionality specifically related the event model (events, such as a keypress or a mouseclick, received by each object and the 'event handlers' that react to each event) may also be specified on the base class. These classes may be organized into a framework. But frameworks provide more than an amalgam of classes. Frameworks also provide a structure for integrating these components, a predefined interoperation of components, and, if designed well, a basic skeleton for developing an application. By promoting reuse of code, design, and prototype architecture, a framework helps developers create an application in a timely manner while still permitting them to customize the application to the user's requirements and benefit from the framework's maturity, robustness and stability.

Dynamic HTML (DHTML) and Document Object Model (DOM) allow authors direct, programmable access to the individual components of their Web documents, from individual elements to containers. This access, combined with the event model, allows the browser to react to user input, execute scripts on the fly, and display the new content without downloading additional documents from a server. In this object model, every HTML/Web element/object is programmable. This means every HTML element/object on the page may comprise a script that changes the page content dynamically in response to user actions, i.e., moving the mouse pointer over a particular element, pressing a key, or entering information into a BF form input. Stand-alone scripts may also be shared between pages and components. Each object may contain a pointer to a script that comprises client-side computer executable instructions for execution via the user's browser to modify content without having to go back to the server for a new file. Client-side scripts promote the creation of interactive Web sites because users do not have to wait for new pages to download from Web servers. A client is the requesting program or user in a client/server relationship. The user of a Web browser is effectively making client requests for pages from servers all over the Web. Ultimately, the speed of an individual's browsing and the performance of the Internet as a whole improves. See, http://msdn.microsoft.com/library/default.asp?url=/worksbop/author/om/doc_object.asp. In DHTML, every HTML element is a scriptable object, with its own set of properties, methods, and events. See, http://www.w3schools.com/dhtml/default.asp.

DHTML may include a combination of some version of HTML (including cascading style sheets and the DOM), Style Sheets and scripts written in JavaScript, VBScript, or some other browser compatible scripting language (and equivalents thereof). Cascading Style Sheets (CSS) provide a style and layout for HTML documents. The DOM provides a document content model (map) for HTML documents which allows access to every element in the document. DHTML is the art of making HTML pages dynamic by using scripting to manipulate the style, layout and contents of the document. With a scripting language, we can access the elements in the DOM. Event handlers allow access to these scripts.

Although object-oriented programming, frameworks and dynamic HTML/DOM are known in the art, developers have not found a way to utilize the unique features of each of these components to maximize the development of web pages. On the World Wide Web, a web page is a file notated with the Hypertext Markup Language (HTML). Usually, it contains text and specifications about where image or other multimedia files (web elements) are to be placed when the page is displayed. For instance, developers commonly code elements in a web page in such a way that the implementation of the dynamic functionality provided by a client-side script is directly encoded into the object itself as a method of that object. Alternatively, the object may contain a pointer to the specific script. A script, however, is not an object and the only reuse that may occur with web pages using this technique is via the archaic cut and paste method. Such code must then be hand modified to conform to the particularities of the next HTML element, which needs such functionality. Thus, a new method and system for programming client-side web pages is required.

SUMMARY OF THE INVENTION

This application addresses a need in the industry for a robust framework, which promotes greater code reuse and stability in the development of web-based user interfaces, by exploiting the advantages behind client-side scripting and Java subclassing. In information technology, the user interface (UI) is everything designed into an information device with which a human being may interact—including display screen, keyboard, mouse, light pen, the appearance of a desktop, illuminated characters, help messages, and how an application program or a Web site invites interaction and responds to it. Web-based refers to websites/webpages or a related collection of World Wide Web (WWW) files.

The framework may be specifically geared toward self-care clients (Internet-based clients that allow an end-user access to the system using a web browser to "care" for themselves) and call-center web clients (used by customer services representatives). Such interface designs may be highly controlled (where the end-user or CSR is confined to processing defined steps using a defined interface) or exploratory (where the end-user or CSR is free to navigate around and selectively operate the application). A browser is an application program that provides a way to look at and interact with all the information on the World Wide Web or other network system including intranets, extranets, peer-to-peer networks, etc. The framework is unique in the way it develops these interfaces because it allows the developer to separate the appearance and the management of each particular HTML element into two separate objects (display object/management object) wherein the management object not only manages the display object but is also highly extensible. The framework may further include composite objects. Composite objects comprise an object that is created by combining two or more objects. Finally, the framework may be designed to act independent of a specific browser or browser version. The framework may comprise JavaScript files, style sheet files, and HTML code examples that ease the task of web client development.

One embodiment of the invention comprises a framework, which further comprises a class designed for the instantiation of a shadow object/management object. Shadow objects may be instantiated from abstract classes and associated with a display object/element/DOM component. The shadow object may manage the display object. Thus, a given user interface component/widget may be divided into a display object and a corresponding shadow object by defining the shadow object as a data element/attribute of the display object. The shadow object may be used to facilitate code reuse for functionality associated with the display object such as data validation, masking, and state management. Data validation includes the verification or comparison of data against another source to confirm its veracity, format, etc. Masking refers to the reformatting or overlaying of data to conform to a more acceptable format (i.e., a user enters 5132894521 into the system and the masking functionality reformats the data entered into (513) 289-4521). State management functionality includes the alteration of elements on a web page in response to specific actions or non-actions by a user (i.e., enabling a submit button when the proper number of digits are entered into a telephone field).

Shadow objects may be associated with DOM elements such as windows, navigators, events, collections, documents, forms, inputs, selects, options, textareas, tables, editable tables, tablerows, tablecells, anchors, images, framesets, frames, iframes and more. Each of these generic shadow objects may be further specialized/extended. For instance, the Input Element object <INPUT> represents an INPUT element, which can be of the following types: button, checkbox, file, hidden, image, password, radio, reset, submit, or text. These elements and others are within the knowledge of one skilled in the art. Each type of <INPUT> element may have a corresponding shadow object. An editable table is a web element that may extend a base table by giving it editable rows. An editable table is a table or grid of data that may appear as display-only in normal mode. Once a user takes an action, such as click on a cell, the user may be able to modify the contents of the cell.

A given shadow object may be derived from a base shadow class geared toward a specific management, for instance, validation of a social security number. Derivation is the process of instantiating an object. An instance is a particular realization of an abstraction or template such as a class of objects or a computer process. Instantiation is the creation of an instance by, for example, defining one particular variation of object within a class, giving it a name, and locating it in some physical place. The derived class may include and extend the base validation class created to govern general data validation for any given widget in the user interface. The base class might include functionality common to all validation rules such as "Is mouse click valid?" or "Is text entry valid?" These functions and/or others may be included in the derived class that is specific to the particular instance of the display object such as social security number textbox, or city drop-down list, etc. Specific management features may be assigned to the shadow object as attributes/methods. This allows the web developer to code the specific management features it needs for each widget/DOM component by adding an "instance" of that widget's shadow object rather than cutting and pasting generic management code.

Ordinarily, client-side data validation is a cumbersome task for the Web developer, requiring many hours of Javascript coding. The framework may be designed to provide shadow objects with numerous validation methods that may be used and extended as necessary. Some validation methods include date validation (i.e., validating that an expiration date is in correct date format and is later than the current date but less than 90 days in the future); telephone number validation (i.e., validating that a telephone number has the correct number and arrangement of digits and that the area code and exchange fall within a specified range); credit card validation (i.e., checking that the card number entered by the user has the correct number of digits and passes a basic validation test); minimum selection testing (i.e., checking that a new subscriber has selected at least one service).

Like data validation, state management allows the Web developer to prevent incorrect or incomplete information from being sent to the Web server by disabling and enabling buttons or other components based on the user's input. One embodiment of the framework may be designed to provide shadow objects with state management methods that may disable the submit button until after the user has entered or selected all required information; make parts of the screen invisible until the user selects a specific check box or radio button, so that the user doesn't waste time entering unnecessary information; and/or run a customized function based on the application's state management requirements.

The framework may be further designed to provide shadow objects with data masking methods to allow users to enter information in a familiar format without unnecessary text boxes or keystrokes (e.g., automatically providing the hyphens and parentheticals for a user entering a phone number).

In another embodiment, the framework may be designed to provide shadow objects with methods that affect other aspects of the display object/DOM component. For instance, a shadow object may comprise an attribute of a DOM component that triggers a help function or a pop-up help file for that DOM component when a predefined key is pressed while the DOM component is in focus. Each component on the page can be associated with a specific URL that is part of the Help system.

In addition to providing a framework, which may provide the classes for shadow objects geared toward management, validation, masking, and other functionality, the framework also provides an improved infrastructure for developing standard web clients. The framework may farther provide composite DOM components (display classes) and classes for associated shadow objects to improve the speed of development time. While such components may be jury-rigged on a given web page, such components are not provided as part of the DOM or as a DOM component for use in web development. A framework may be specifically geared to the development of user interfaces for a particular industry such as billing or telecommunications and provide composite components that are applicable to those industries. Thus, the framework may extend the DOM by providing a palette of composite objects such as social security number inputs, credit card/expiration date inputs, control number inputs, address inputs, telephone number inputs, an accumulator list box, date and time inputs, multiple pane tab controls, drop-down and pop-up menus, tree menus, and more.

In another embodiment, the framework may be further developed to "standards" instead of to specific browser versions. Rather than basing the functions that get executed and the attributes that get interpreted on a derived web browser manufacturer and version number, the method queries the web browser environment on the client-side for the presence of specific functions and attributes that are defined in the various browser specifications. If not present, other less "standard" functions and attributes are utilized. This provides functionality for web-based applications across multiple web browser types without creating multiple versions of code for each function utilized by the application.

In another embodiment, the framework may be further configured to provide tracing and searching functionality. Tracing functionality allows the developer to track what is being executed on the Web page. This may include checking what functions called other functions and in what order; argument values; displaying variable values and the logic path that the function takes when it runs; displaying more detailed attribute values for a specific object and variables/attributes; and displaying information in an alert message box and pausing the function. Tracing levels may be combined and a tracing level may be changed at a specific point in the debugging process.

The framework's searching functionality allows the Developer to search the Document Object Model (DOM) for a specific object or objects by name or ID. Functions may also be provided to allow searching across a single document or multiple documents in a frameset.

The framework may also be designed to include cookie functionality. Cookies are small files that Web pages store in a specified place on the user's hard drive. These files allow a Web page to store and refer to information about the user and his or her preferences so that on a return visit, the Web page can "greet" the user, or present content customized for the user.

In another embodiment, a framework embodied on a computer-readable medium for designing a web-based user interface comprises at least one management class associated with a display class; wherein said at least one management class is not derived from said at least one display class; wherein an object instantiated from said at least one management class (management object) may be associated with an object instantiated from said display class (display object); wherein said management object manages said display object; wherein said web-based user interface may be developed using said at least one management object and said at least one display object; and wherein a set of computer-executable instructions associated with said management object (management object code) may execute within a browser associated with a user of said web-based user interface. A management class is a blueprint of the methods and variables (attributes) in a management object. The management object manages the behavior of its assigned display element. The management object code of the framework may further be included as part of a web page when said web page loads into a browser. The management class of the framework may also further comprise at least one subclass. In this framework, the display class may be associated with a web element's appearance and the management class may be associated with a web element's behavior. Furthermore, multiple management objects may be combined to create composite objects that may be associated with a corresponding display object. These composite objects may include the following display objects and other analogous display objects: a social security number input; a telephone number input; an accumulator list box; a date input; a time input; a multiple pane tab control; a drop-down menu; a pop-up menu; a hierarchical component, and a tree menu.

In another embodiment, said management object code may execute within said browser and said management object code may be designed for use by customer service representatives receiving orders, inquiries, etc. via the Internet or through the phone. Call center user interfaces sometimes include scripting prompts for the customer service representative to follow in their dealings with a customer.

In another embodiment, the management object may be implemented with a set of methods and attributes for the design of a web-based customer-care interface and/or a web-based call-center interface.

In another embodiment, the display object comprises an HTML element. The display object may include one or more of the following elements: window, navigator, event, collection, document, form, input, select, label, background, foreground, pane, tab, option, textarea, table, DIV, tablerow, tablecell, anchor, image, frameset, and frame. The input element may include buttons, checkboxes, files, hidden, image, password, radio buttons, resets, submits, and text entries.

In another embodiment, the management object may be associated with the display object by defining the management object as an attribute of said display object.

In another embodiment, the management object may manage at least one validation, masking, state management, and/or help function for said display object. The validation function may include credit verification, address verification, and identity verification.

In another embodiment, the framework may also include at least one tracing mechanism; at least one DOM component searching mechanism; at least one math rounding feature; at least one sniffing function; at least one comment stripping function; and at least one cookie function.

In another embodiment the management class and said display class may be related through a common superclass.

In another embodiment, there is provided a method for creating web-based user interfaces comprising utilizing a framework encoded on a computer readable medium wherein said framework comprises at least one management class that is not derived from a class associated with a respective display object; instantiating at least one object from said management class (management object); associating said at least one management object with said respective display object; creating a web-based user interface wherein said management object manages said display object by executing a set of programming instructions associated with said management object within a browser associated with a user of said web-based user interface.

In another embodiment, there is provided a method for creating client-side user interfaces comprising separating at least one web component into a display component and a management component; designing a set of classes (framework) comprising at least one display class and at least one management class; associating said at least one display class with said at least one management class through a common superclass; implementing at least one method and at least one attribute through said management class; instantiating an object from said management class (management object); instantiating an object from said display class (display object); associating said management object as an attribute of said display object; designing a client-side user interface with said at least one set of associated management and display objects.

In another embodiment, there is provided a method for creating client-side user interfaces comprising the steps of providing a framework wherein said framework provides a set of management objects to manage the behavior of a web-based component; composing a display object comprising at least one of said set of management objects as an attribute; executing a set of computer executable instructions associated with said management object within a browser associated with a user of said client-side user interface. The set of management objects may be extended to include one or more of the following advanced management objects: a composite component, a validator component, and a hierarchical component.

In another embodiment, there is provided a method for creating web-based user interfaces comprising the steps of designing a web-based user interface according to a framework wherein said framework provides a set of management objects which manage a set of behavior associated with a set of web-based components associated with a web-based user-interface; allowing a user to request said web-based user interface from a server wherein a set of computer executable instructions associated with said web-based user interface comprises the steps of: creating a set of display objects; creating a set of management objects; associating said management objects with said set of display objects; loading a set of computer executable instructions associated with said management objects in a browser associated with said user; manipulating said display objects via said management objects within said browser in response a user action in said web-based user interface.

In another embodiment, there is provided a framework embodied on a computer-readable medium for designing a web-based user interface comprising: means for displaying a web element; means for managing a behavior associated with said web element; and means for associating said means for managing with said means for displaying; wherein said means for managing said behavior executes within a client-side computer means in response to a user's manipulation of said web element. The means for managing the behavior may include accessing a server.

In another embodiment, there is provided a framework embodied on a computer-readable medium for designing a web-based user interface comprising a set of management classes, wherein each management class within said set is respectively designed to manage a specific type of web element; wherein an object instantiated from said management class (management object) is associated with a respective web element; wherein said management class does not derive from a class associated with said web element; wherein said management object manages said display object; wherein said web-based user interface is developed using said set of management objects along with their respective web elements; and wherein a set of computer-executable instructions associated with said management object (management object code) executes within a browser associated with a user of said web-based user interface when said user manipulates said web elements.

In another embodiment, the composite components may take advantage of the original BF shadow objects. Instead of creating composite components using JavaScript embedded in the HTML document, the Composite Components may use an HTML interface independent of a specific browser type or version. This may be achieved by designing the management object code to query a web browser specification (a document or file that may be parsed to determine how the web browser operates and may be interfaced by other programs) associated with said browser for a set of functions (browser-specified functions) and to execute said management object code via said browser-specified functions. The management object code may be further designed according to a set of standards. These standards may include Document Object Model, Hypertext Markup Language, Cascading Style Sheets, JavaScript and other web-based/user-defined standards.

In another embodiment, said management class may comprise at least one abstract superclass. A set of subclasses may be derived from the at least one abstract superclass to provide management functionality for a set of respective HTML elements. An additional subclass may be derived from said abstract superclass to extend said framework to provide functionality for an additional HTML element. Alternatively or in combination, the additional subclass may be derived from said abstract superclass to customize said framework to provide additional functionality for said set of respective HTML elements.

In another embodiment, the management classes may be designed to manage a set of display objects associated with a web-based customer care user interface and/or a web-based call center user interface. A customer care user interface is an interface designed for the use of a customer end user to allow them to obtain information about a company or issues concerning their account. Customer care websites may also include contemporary text chat with a customer service representative through the website. A call center user interface is Therefore, composite components may be created using JavaScript as follows:

<body onload="initBF(document,0,0);">..<script language="JavaScript1.2" type="text/javascript"><!——BFdate1=new BFDate("date1", "MDY", "1998", "2004", "date1group");//——></script>.

Or, composite components may be created using HTML in the following manner:

<body onload="BF.init( )">..<span id="myDate" BFclass="BFcdate" BFstartyear="1999" BFendyear="2006" BFsubjectgrp="group1" BFFormatType="LONG"BFValue="current"></span>

The latter method may provide a consistent interface for all BF elements as well as easy integration with other BF functionality such as state management observer behavior and context sensitive help.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 5 illustrates a tab composite widget.

FIG. 6 illustrates a multi-tab composite widget.

FIG. 15 is a table of the one embodiment's set of shadow objects.

FIG. 16 is a table of one embodiment's set of framework attributes.

FIG. 17 is a table of one embodiment's set of validator objects.

DETAILED DESCRIPTION OF THE EMBODIMENTS

Embodiments of the invention are provided for a Browser Framework (BF) for web-based client-side user interface development. One skilled in the art should preferably have a working knowledge of Web browsers (i.e., Microsoft Internet Explorer, Netscape Navigator, etc.), Hypertext Markup Language (HTML), Javascript (a client-side programming language), the use of cascading style sheets (CSS) or equivalent skills, and a Web page development tool such as Microsoft's FrontPage, Macromedia's Dreamweaver, Allaire's HomeSite or equivalents thereof.

The DOM or Document Object Model comprises the objects created when a browser displays a web page. The DOM provides a common organization and method of accessing HTMLElements and Objects (i.e., button; checkbutton; form; radiobutton; select; table; editable table, text). Various embodiment of the invention provide a method and system for interfacing with these DOM components to achieve greater reusability for components in a web page by separating their appearance from their functionality via a shadow object.

Figure 1:
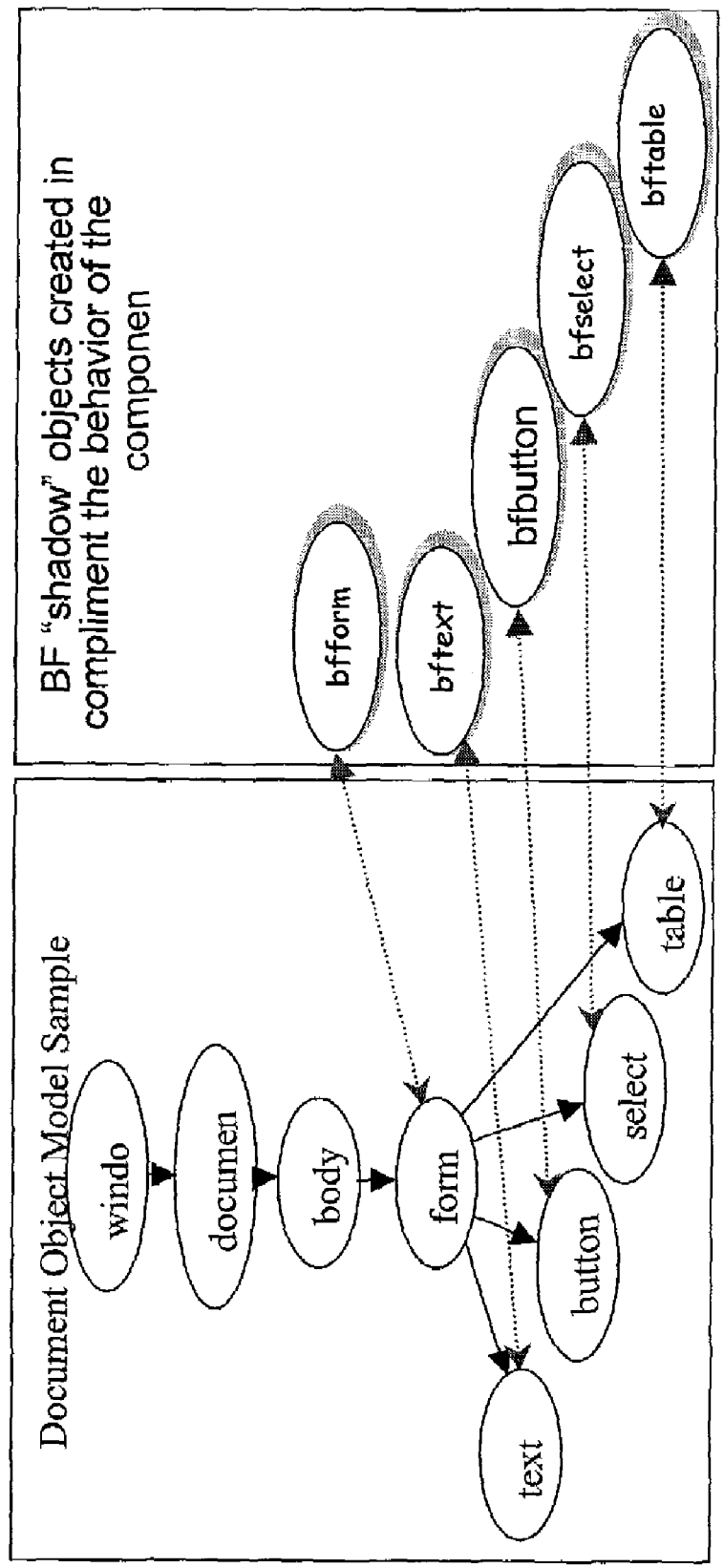
FIG. 1 is a diagram illustrating the Relationship of HTML Document Object Model (DOM) components on a Web page and their associated framework shadow objects.
Figure 4:
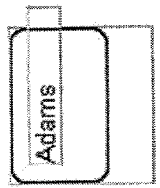
FIG. 4 illustrates the tab label.
Figure 3:
FIG. 3 illustrates the tab pane widget.
Figure 2:
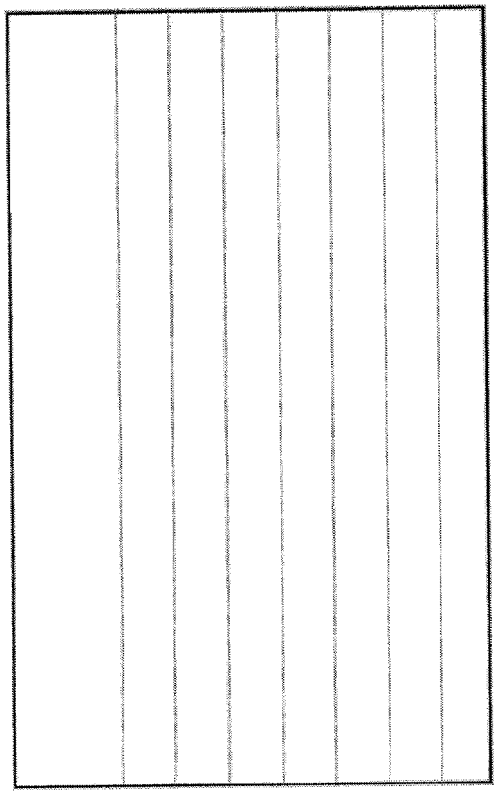
FIG. 2 illustrates the blank notecard jpeg.
Figure 7:
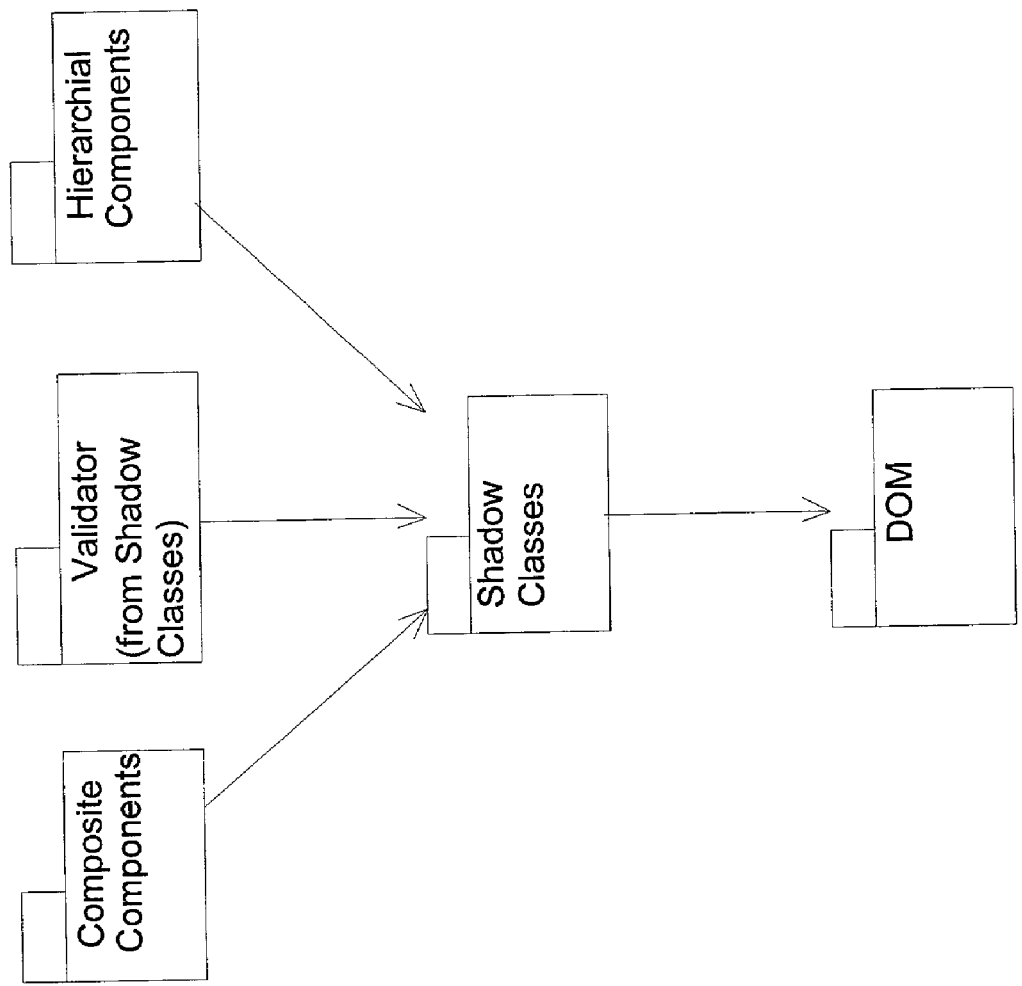
FIGS. 7 and 8 illustrates diagrams, which show the interaction of the components of the framework classes and the DOM

Referring to FIG. 7, shadow objects are objects associated with a DOM object or component. Shadow objects are derived from a class separate from the class governing the DOM component. Therefore, shadow objects are not instantiated from the class governing the DOM component. The DOM components' classes and the shadow objects' classes may, however, have a common super-class. Referring to FIG. 1, in one embodiment the shadow object may be specified as an attribute of an HTMLElement/DOM component such as an <INPUT> box. Events affecting the HTML component invoke methods in the shadow object to do work, i.e., validating user input in the <INPUT> box. Not only may the specific class of shadow object be specified as a data element of the component but other attributes can be specified that define how that shadow object behaves and interacts with its partner display component. FIG. 1 illustrates the relationship of HTML components on a Web page and their associated BF shadow objects. Separating the data structure from its visual representation allows the same data structure to be rendered differently depending on the clients needs.

Referring to FIG. 15, webpages may take advantage of at least one embodiment of this invention by associating at least one HTML component (and as many as desired) with a shadow object contained in the BF. To fully exploit the advantages inherent in client-side scripting, the BF code may be included as part of the web page when the page loads. In this embodiment, only those objects that are associated with a BF shadow object will use the BF functions.

To create a BF shadow object and associate it with an HTML component on a Web page, a BF class attribute may be added to the HTML code of the component. For example, this line of code, <input type="text" name="zip5" size="5" maxlength="5" framework class="framework text" framework helpfile="sample4help.htm">, creates a BF text shadow object for an <INPUT> text box and declares the BF helpfile attribute value. When the user places the cursor in the BF text box and presses F1, a Help window opens, displaying the file sample4help.htm.

Figure 8:
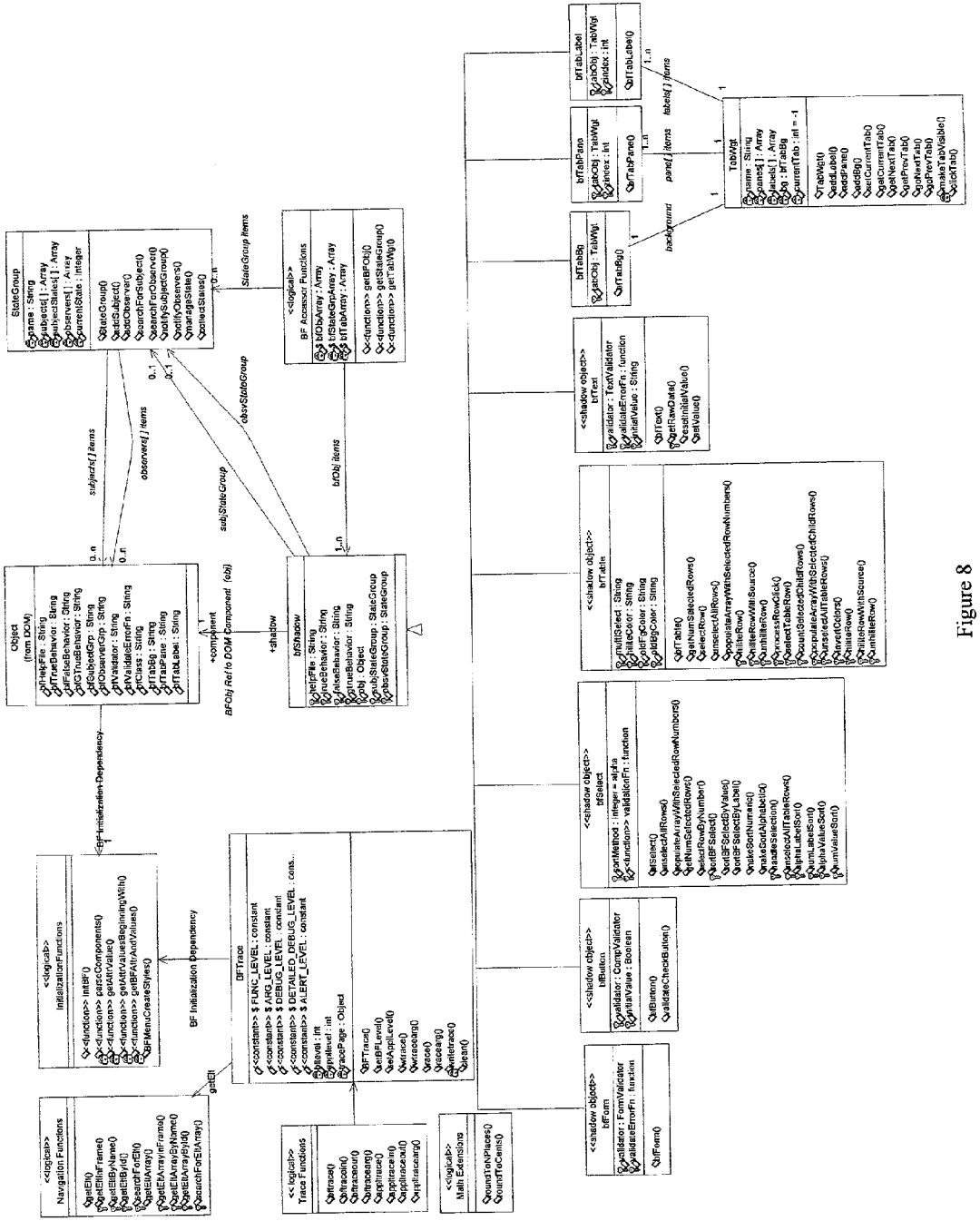
Figure 13:
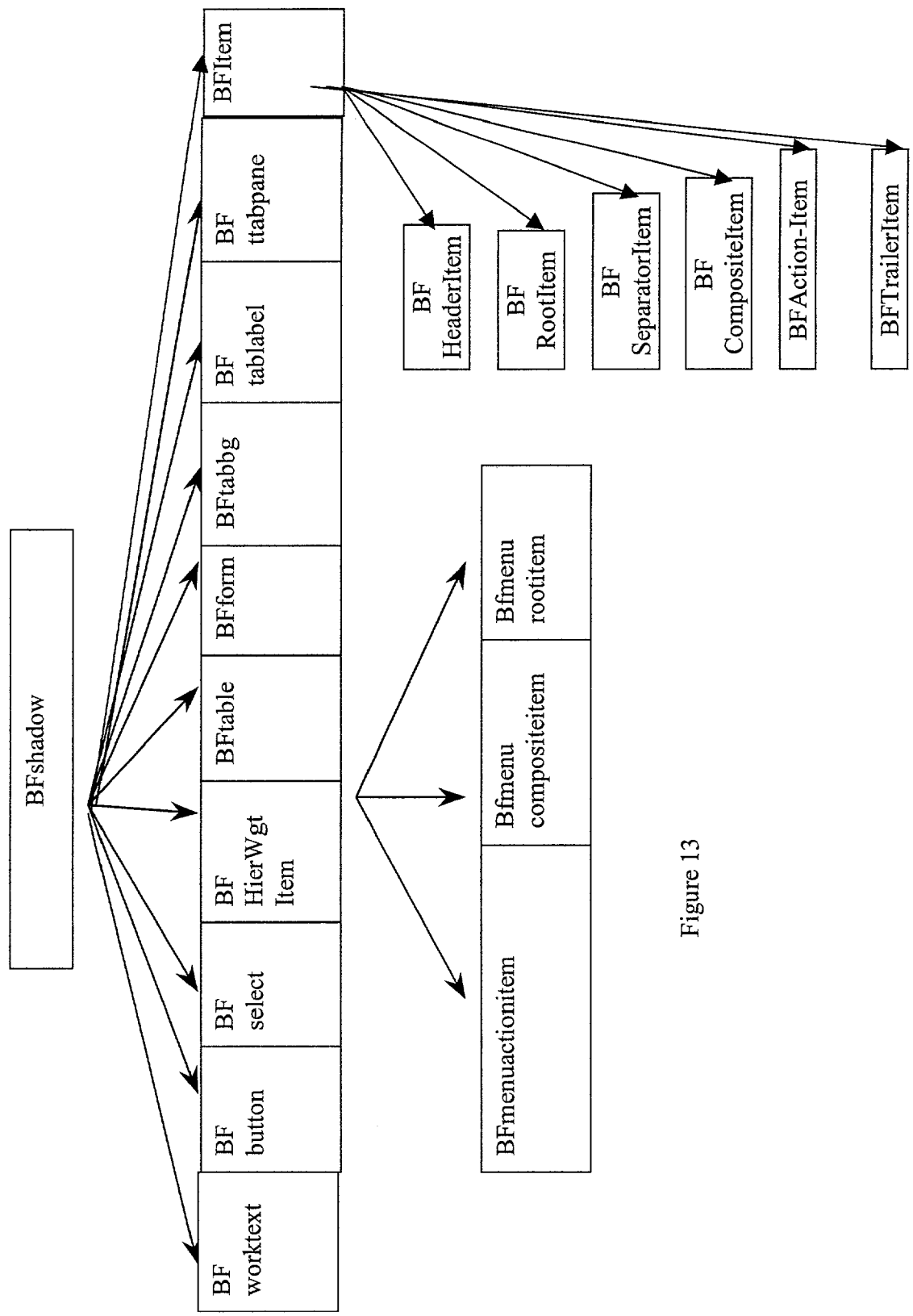
FIG. 13 diagrams the hierarchical structure of one embodiment of framework Shadow.
Figure 19:
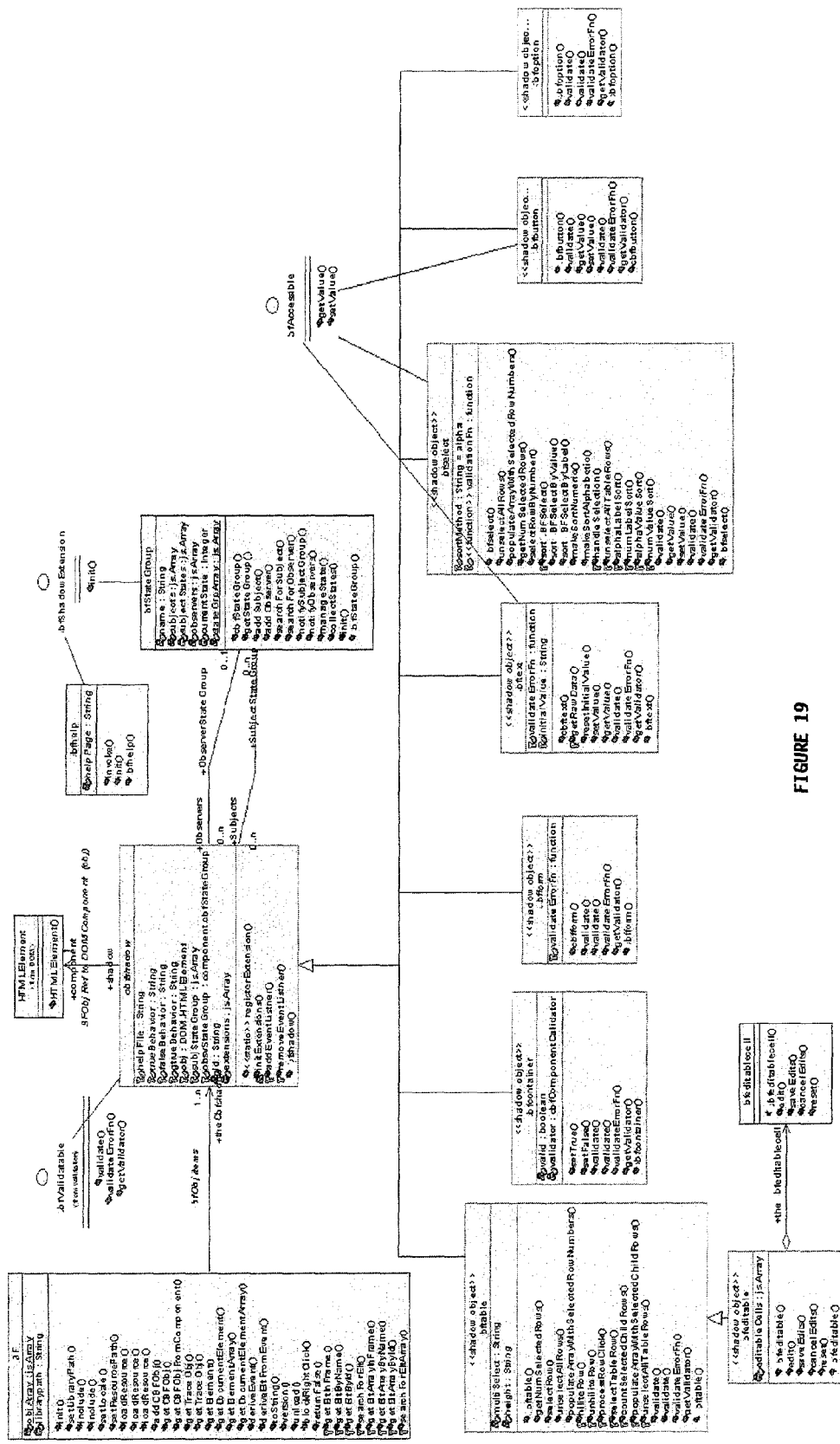
FIG. 19 is an extension of FIG. 8, which displays how the web element, editable table, interacts with the other web components and the DOM.

Referring to FIG. 13, BF class objects may have a root class: BF shadow. This may be an abstract base class to allow the development of additional classes that are not provided in a given BF. Additional child classes may also comprise abstract classes for further extensibility. The attributes and methods within a given class may be public, private, static, etc. FIGS. 8, 16, and 19 depict two embodiments for a BF. These classes may define the templates for all shadow objects and their interaction with their DOM counterparts.

The classes may include a variety of functionality. For instance, a shadow object BF Select may be instantiated and associated with any <SELECT> components embedded in the webpage or <OPTION> components embedded in a given <SELECT> component. This shadow class may include its constructor; methods to unselect rows; gather the rows in a "selected" state; count the number of rows selected; set a particular row to a selected/unselected state; sort options within a select component by the attributes ID, numerically, alphabetically, etc.; process a selection; compare attributes within a <SELECT> component numerically, alphabetically, etc.

In another embodiment, the shadow object, BF Table, may be instantiated for a <TABLE> component in a web browser page. It also operates on any components embedded in the <TABLE> component. It may include its constructor and methods which return the number rows selected in the BF table; select/unselect row(s) in BF table; populate an array with identifiers of rows in a selected state; highlight/backlight/unhighlight rows; and process selections. Referring to FIG. 19, an editable table component is diagrammed including the methods pertaining to that element. This element may be derived from the <TABLE> component.

The shadow object, BF Text, may be instantiated for the <INPUT type="text"> component and/or the <INPUT type="password"> component in a web browser page. Methods included with this shadow object may include its constructor; setting the value of the textbox to an argument provided; and extracting data from the textbox (including the skipping of dead/mask characters).

The TabWgt shadow class may provide control to a "tab" component by working with <DIV> components provided by the DOM. W3C introduced the <DIV> component in the DOM Level 1 HTML specification. It contains a list of references to the <DIV>"labels" that appear across the top of the tab, a list of references to the <DIV>"panes" that appear in the main area of each tab, and a reference to a <DIV> background component. A shadow object may be instantiated for each <DIV> tag, which specifies a BF Class attribute with a value corresponding to that component. There may be provided constructors and methods to add a label, add a pane, set the background, set the current tab, and query the current, next, and previous tab; go to the next and previous tabs; static clickTab method used as a response to a onclick event receive by a BF TabLabel's <DIV> component; and make a tab component invisible or visible.

The base shadow class and the other shadow classes, provided within the BF, may be used to create a new shadow class with specified methods and attributes. For instance, <FORM> components generally contain <DIV> components. Ordinarily, information inside <DIV> components is ignored when the <FORM> is submitted. The base shadow class may be extended to process each <DIV> component when the submit event is received by the associated DOM component. Note that any new BF class should preferably have either the root shadow class or one of the root's children as its parent.

In another embodiment, referring to FIG. 13, the BF may provide a BF Item class and a BF HierWgtItem class. These classes may have associated child classes that may be used to create new types of classes such as drop-down menus.

Figure 14:
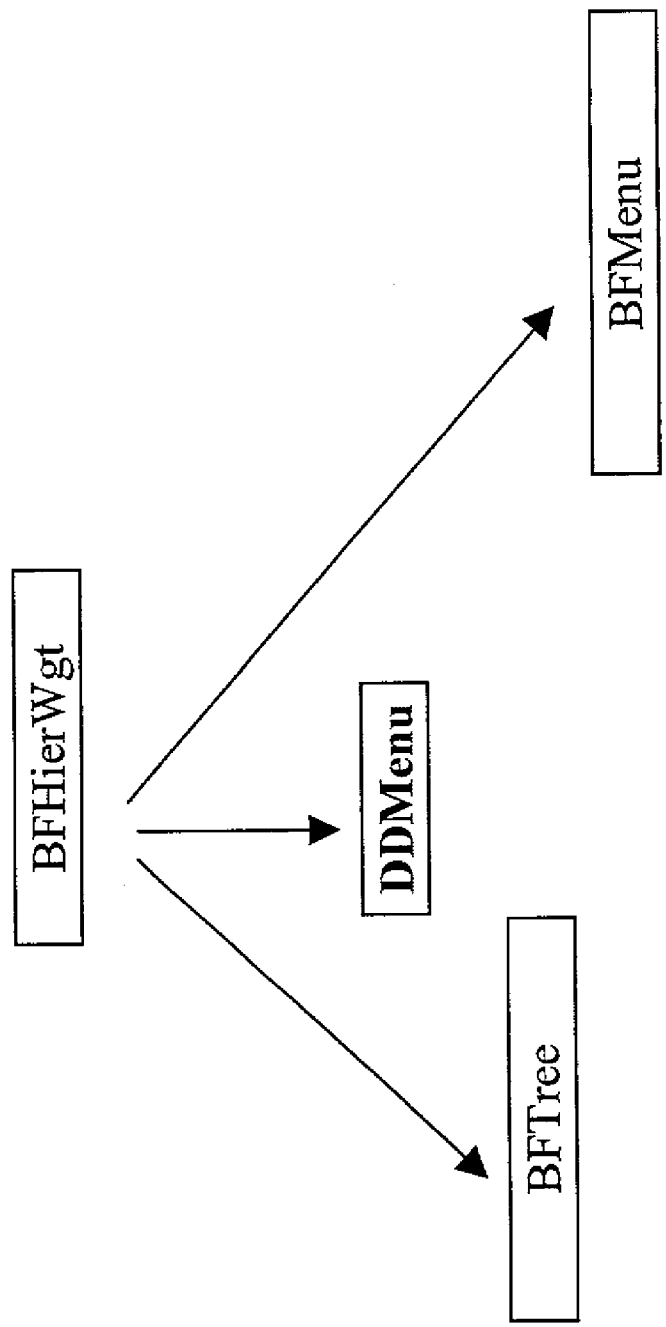
FIG. 14 diagrams the hierarchical structure of one embodiment of framework Hierarchical Widget.

Referring to FIG. 14, these item classes are organized using classes that are children of the BF HierWgt class. This inheritance relationship allows the subsequent child classes to inherit the data/attributes and methods/functions present in the BF HierWgt class. Data/attributes may include the name attribute; item attribute; prefixes to distinguish one menu instance from another on the same web page; a string of HTML text that is written out to the document, which creates the physical menu; and rootElement; etc. The methods/functions may include initialization functions, html generation to create the menu on the web page; returning the value of the root element; returning the BF object that is associated with the rootElement; writing an item; drawing a separator, header, trailer, CompositeItem or ActionItem (may be provided by the new menu class), drawing the root item; and drawing a line of a menu item.

For a new drop down menu, it may be necessary to implement or override methods provided by the parent class. Of course, new attributes and/or methods required for the new menu class could also be added.

BF shadow objects may be further integrated with server applets so client applications can communicate with server applets to accomplish work that can only happen on the server such as credit verification; address verification; and error logging that may be stored in the application server logs.

State Management

Figure 9:
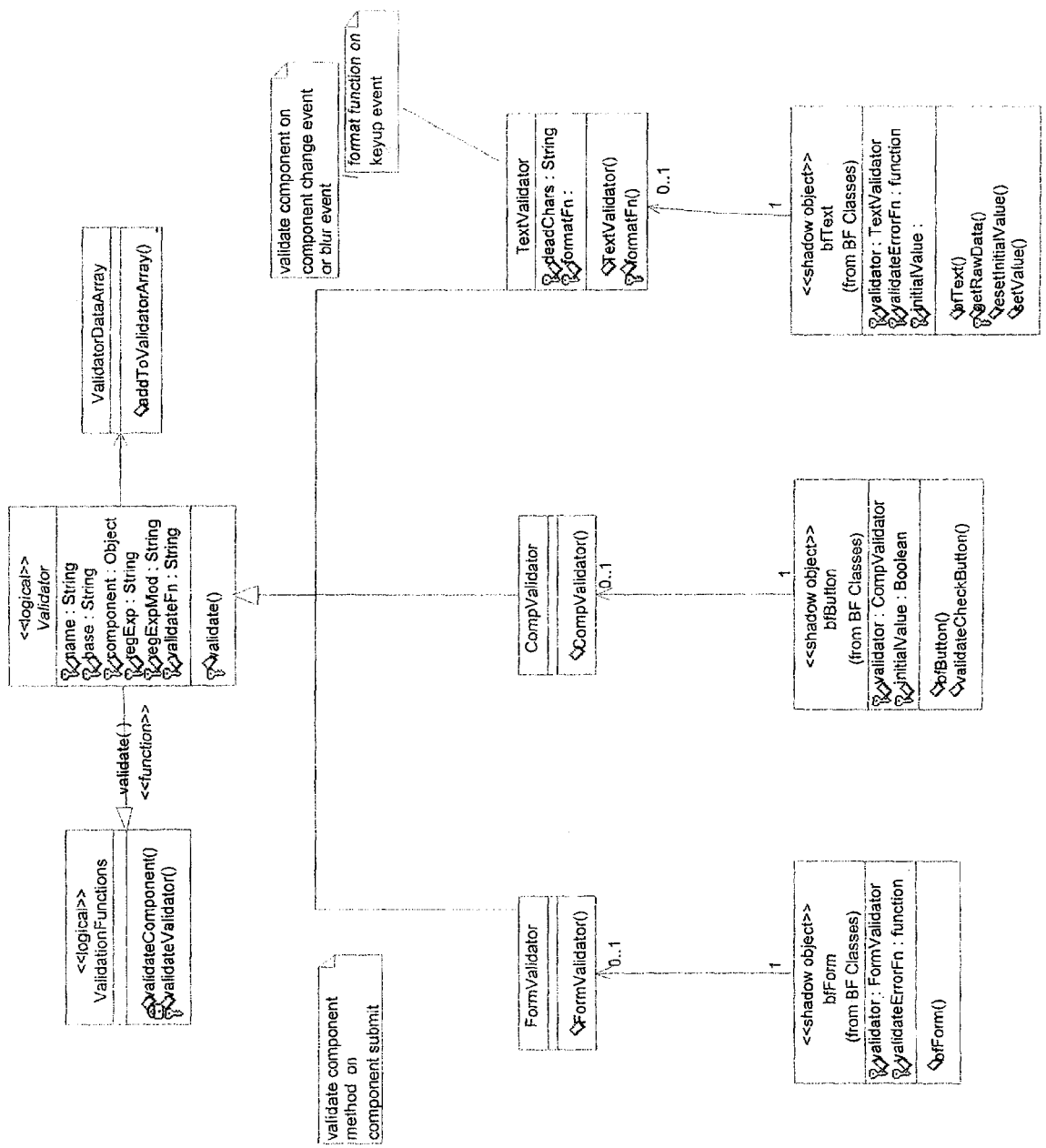
FIG. 9 is a diagram illustrating the validator.
Figure 10:
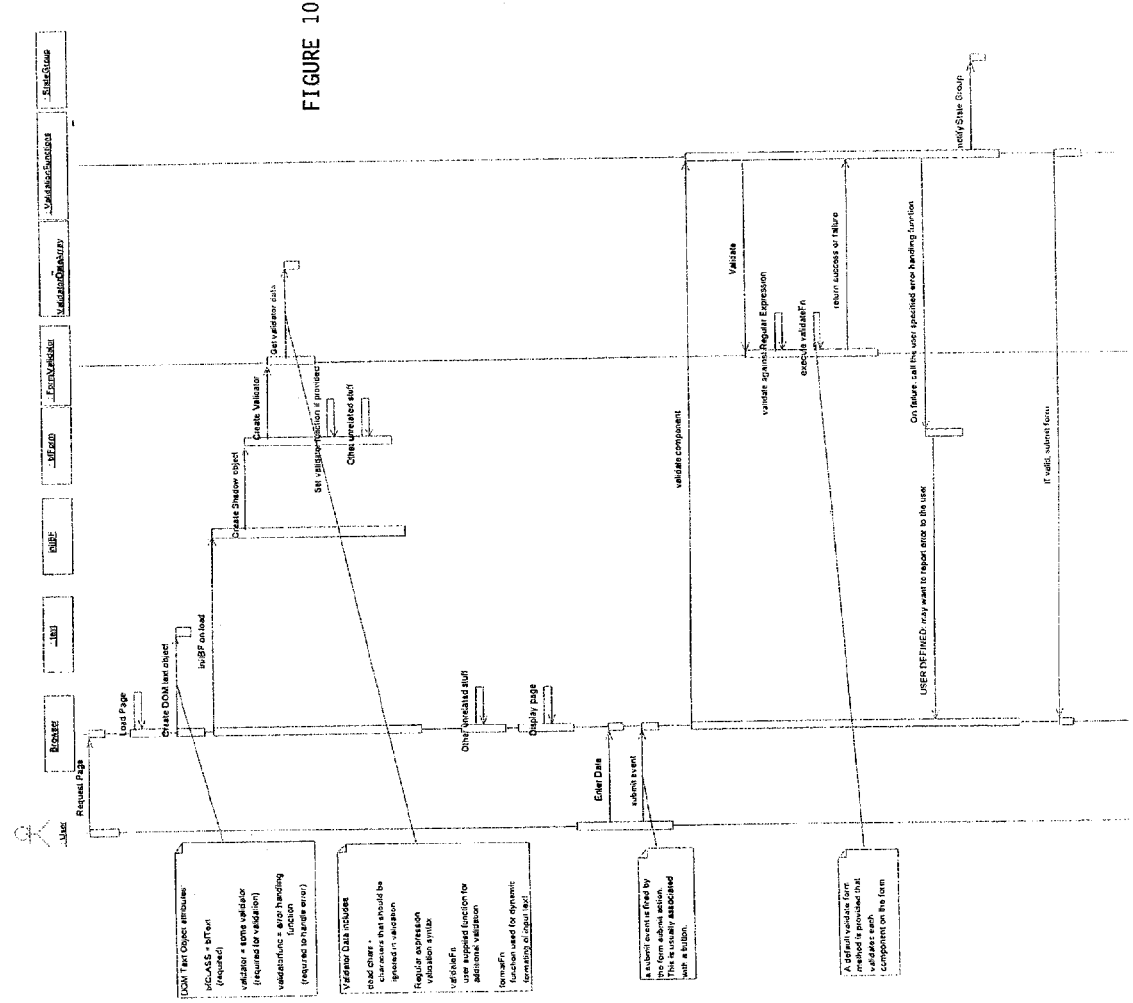
FIG. 10 is a diagram that shows form validation

Referring to FIG. 9, specialized BF shadow classes may be provided for validating and formatting their corresponding DOM components. In one embodiment, form validation is illustrated using FIG. 10.

The BF may provide attributes that can be specified for the shadow objects associated with HTML/DOM components. These attributes may be used by BF to manage the state of certain components based on the state of other components on the page. State may refer to the look and feel of an HTML component; for example, whether it is enabled or disabled, visible or invisible, or has a color or other appearance change. State may also mean the status of a component's validation. A component may be in either a true/valid, false/invalid or greater than gtrue/valid state.

The greater than true state value may be used for components such as the <SELECT> list or a <TABLE>, where more than one item is selected at the same time. With one item selected, these components may have a state value of true. If more than one item is selected at the same time, these components may have a state value of gtrue. State management shadow objects may comprise subjects, observers and groups. A subject object may have a state value and may belong to a group object. An observer object may detect the state of a group object that contains a subject object. A group object may collect the states of its subject objects and may report the aggregate state to its observer objects so the state of the observer objects can change.

For example, a BF form may contain five BF text boxes and one BF button. The BF button may be disabled until all five BF text boxes contain valid data. This may be accomplished by declaring each BF text box as a subject of a group object and declaring the BF button as an observer of that group object. A component can be a subject object in one group object and an observer object in another group object, allowing for some very complex state management situations.

As the user interacts with a state-managed Web pages, the state of each subject shadow object may change and may be updated on an associated group object. The observer shadow objects may be notified of the aggregate group state value, and they may implement specific behaviors associated with each state value. In one embodiment, the BF may include six attributes that may specify the state management details of the BF shadow object associated with the HTML/DOM components: subject group attribute; observer group object; false behavior attribute; true behavior attribute gtrue behavior attribute; and protocol attribute.

The Subject Group Attribute may indicate that it is a subject object in the unique state group. Its status will be observed and used to determine the behavior of observer components in the same group.

The Observer Group Attribute attribute of a component may indicate that it is an observer object in a unique state group. It may receive statuses from the group object and will perform various behaviors accordingly.

The False Behavior Attribute; True Behavior Attribute; and gTrue Behavior Attribute attributes of an observer component may indicate what the behavior of the component should be when the subject object(s) in the group are in a false/invalid, true/valid, or gtrue state, according to the state management rules. Behavior attribute values for these attributes may allow control over the enable/disable, visible/invisible, and inheritance behavior (set the observer component to inherit its behavior from the parent component) of the observer component in response to subject components in the State group. Additional Javascript functions may be written to cause the required behavior, and the name of such functions may be listed as the value of the attribute.

The Protocol Attribute may be related to a subject component. Values for this attribute may include an indicator of when validation should occur (i.e., upon keystroke or upon the component losing focus); what validation should be based upon (i.e., the number of rows in a <SELECT> or <TABLE> component, the number of items selected from the <SELECT> or <TABLE> component; whether a user may continue to the next component without entering valid data in the current component; etc.

Several state management attributes may be created for DOM components to more fully control their behavior, or the behavior of related components, depending on its state (that is, whether or not items are selected from it).

State management methods may include a constructor and methods such as associating a shadow observer/subject/group object with a DOM component; seating for a particular DOM component in a subject/observer array; notifying observers of a change in a subject's state; initializing the state of a subject; executing the changes required of each observer when its subject group is in a particular state; and/or validating a group of subjects in a particular State group.

In one embodiment the behaviors provided by shadow objects for a <TABLE> DOM component include changing the color of <TABLE> rows when the mouse is moved over them, selecting/deselecting one or more rows, limiting how many rows may be selected; specifying whether more than one row of the <TABLE> can be selected at one time; finding out which rows are selected; highlighting/unhighlighting/color inverting rows; keeping track of which rows are in a "selected state"; determining whether a row must be selected; etc.

In another embodiment, a shadow object may be associated with an <INPUT> component that provides validation methods such as determining whether user input contains numeric, alphabetic, or alphanumeric text that is either fixed or variable in length, a correctly formatted 10-digit telephone number, a Social Security Number, and/or a calendar date in various formats.

In another embodiment, a shadow object may be associated with a <SELECT> component to sort a list (alphabetically, numerically, or otherwise) or implement customized behavior when an item is selected or deselected from the list.

Although various attributes are illustrated here for the <TABLE>, <INPUT>, and <SELECT> components, these and other attributes may be assigned to other DOM components where applicable.

In another embodiment, the behaviors provided by the shadow objects for a <FORM> DOM component may include validation behaviors that are triggered when the BF form is submitted. These functions may validate each component of the BF form according to their default validations or any other validation specified for a particular component. The BF form validation functions return either true or false. If true is returned, the <FORM> may be submitted to the server. If false is returned, the BF form may not be submitted to the server, and the BF form's error handling function may be called. Customized validation functions may be coded and integrated into the BF.

The BF provides attributes that may be added to DOM component shadow objects to mask user input so that punctuation is automatically inserted; for example, if the user types "5137915555" in a masked telephone number text box, the text box may display "(513) 791-5555".

The BF may further provide a method for the shadow object associated with a <SELECT> component that allows options to be added to the <SELECT> list. Options in a <SELECT> list may be displayed in the exact order that the <OPTIONS> tags are displayed in the HTML file. Options may be sorted alphabetically, numerically, by value and/or by label. BF provides several sorting methods, along with methods to select items from lists, to find out how many items are selected, and to find out which items are selected. Script may also be prepared to sort options in another manner. BF provides attributes and methods that allow selection or deselection of all items in a list, or individual items. You can sort <SELECT> lists in response to a load event, button clicks, change events, and more.

The BF may use Regular Expressions from Javascript (or other equivalent programming techniques) to develop the shadow objects which further comprise validation/masking objects which validate/mask user input. These sub-objects may include component BF validators (validator components) (i.e., for a <SELECT> list) and BF text validators. They may also be sorted in an extensible object array. A BF validator attribute, with a value equal to one of the object names, may be added to each HTML component. Referring to FIG. 17, the BF may include a number of predefined ValidatorData objects that can be used to validate various types of user input (this is an illustrative but not conclusive list of these predefined shadow objects). The validator shadow objects are used as values for the BF validator attribute. An object may be selected according to the type of component being validated and what validation or masking the BF should perform. The ellipses in the table indicate ranges of objects. For example, "FixedNum1 . . . FixedNum18" refers to objects FixedNum1, FixedNum2, FixedNum3, and so on, up to FixedNum18. During masking process, raw text is tested against a RegExp object that was created using the formatStr argument.

A regular expression is a way for a computer user to express how a computer program should look for a specified pattern in text. The user of a regular expression can then tell the program what it is to do when matching patterns are found. When the required validation rules are too specific and cannot be generalized into a regular expression, BF's validation mechanism can run a customized validation function. This may be done by creating the ValidatorData object and setting its validateFn attribute to the name of that function.

The BF may also provide the addFormatAndMaskStr (formatStr,maskStr) method to specify pairs of strings used by the BF to format and mask text data for a custom ValidatorData object. Uses for this functionality may include a function for removing dead characters from the native string, instantiating the RegExp object, and testing the component data with it; invoking any external function specified; and returning the value returned by that function.

Complex Widgets for Web Clients

In addition to the shadow object classes that may be added to the HTML code, there are a number of other BF classes that can actually generate HTML code and make it part of a Web page.

The generated HTML code includes page components that are "glued" together to perform a specific function. These components can include the shadow objects and attributes previously discussed to control their behavior. They can also include additional shadow objects only used with page components that are generated by BF.

Figure 11:
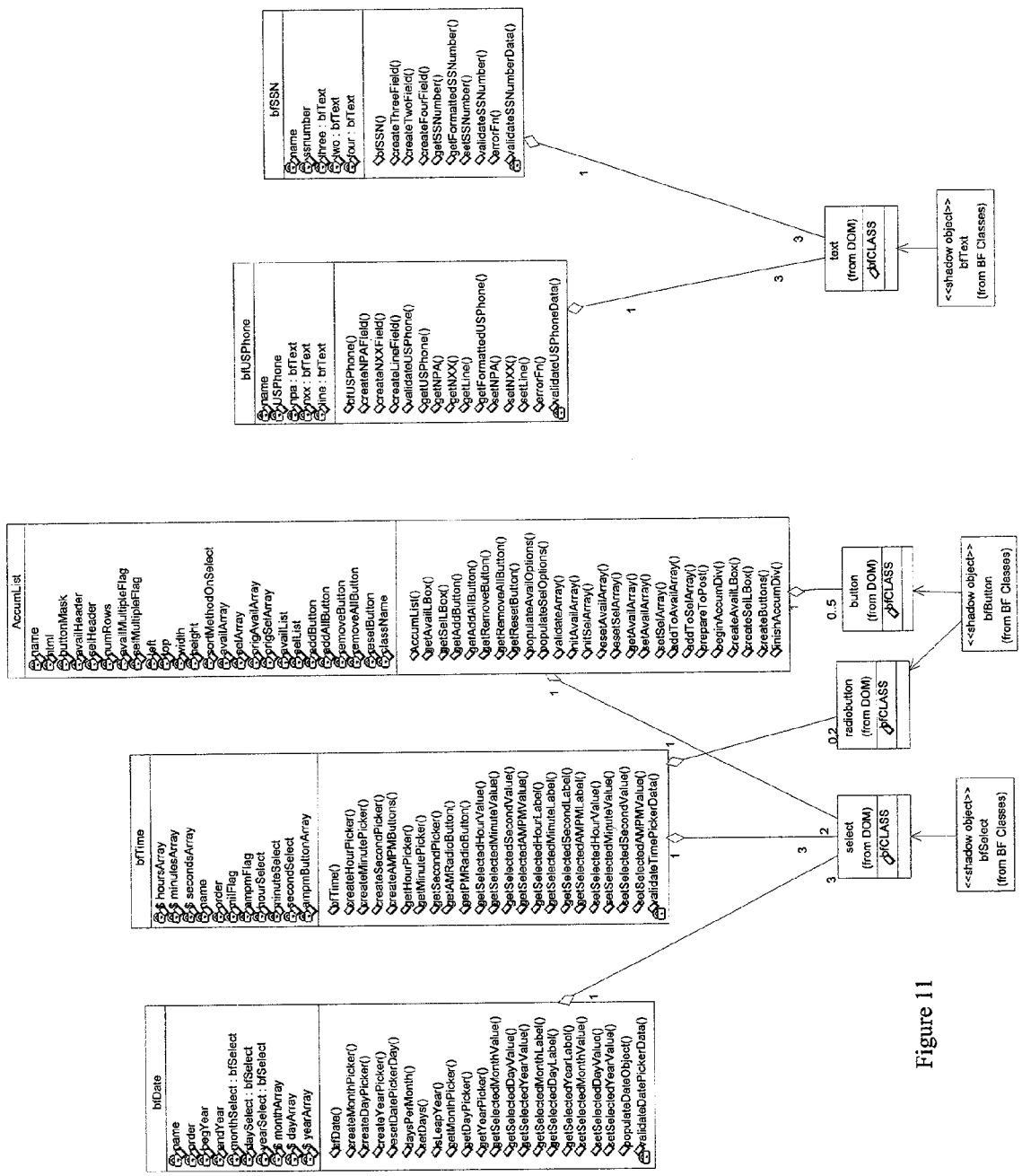
FIG. 11 is a diagram of the composite components.

Referring to FIG. 11, the Composite Components are combinations of other BF objects that work in conjunction to provide a specific service. An example is the BF Date class which combines three BF select objects (one for month, one for day, and one for year) to comprise the date object.

When a composite component is created, the required html is automatically created and written into the html document. The user is saved time by not being required to generate (and regenerate) the code. Hundreds of lines of html and JavaScript code are replaced by only a few simple lines of code. Additionally, the HTML is generated with all of the necessary BF hooks to take full advantage of the BF functionality.

Figure 18:
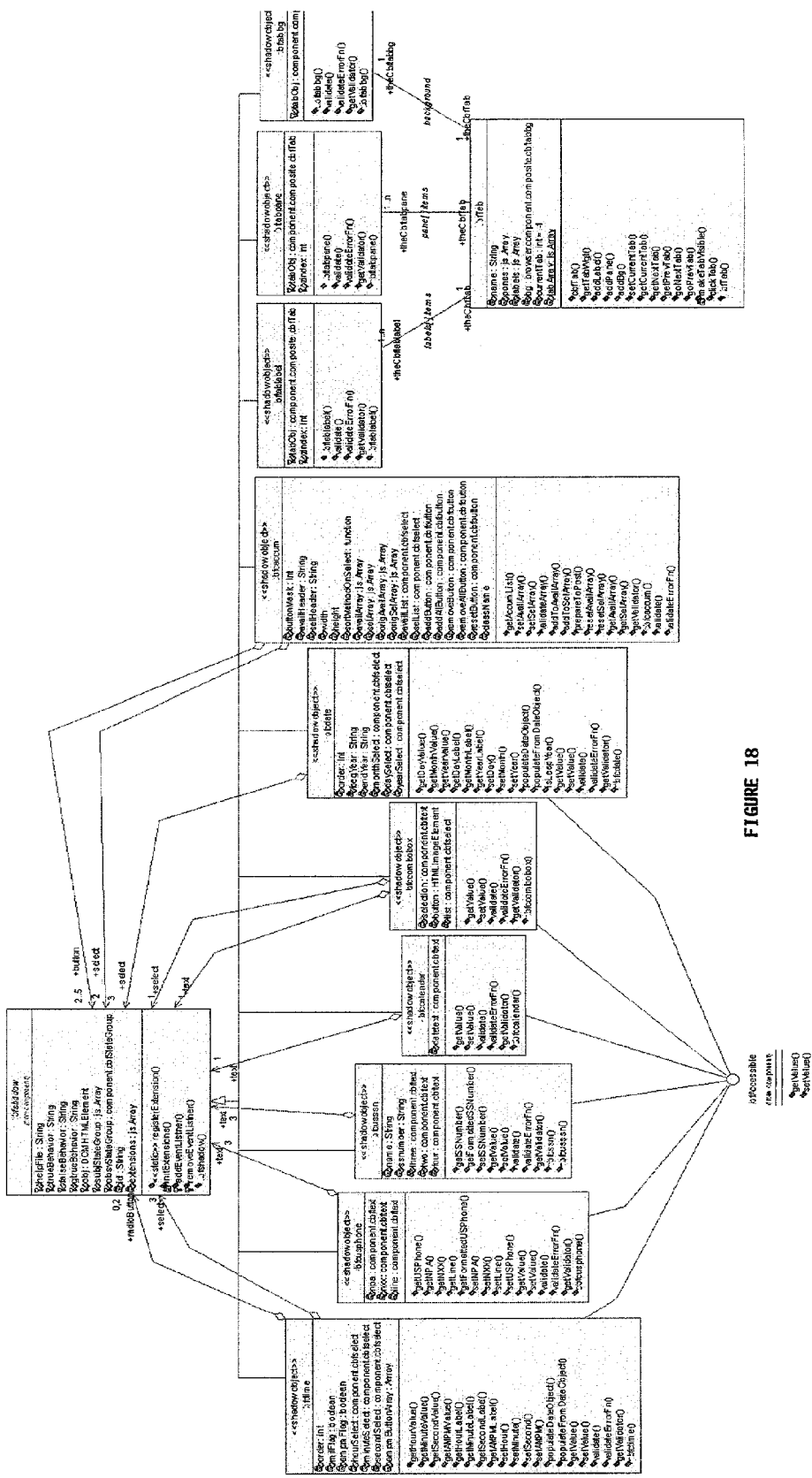
FIG. 18 is a diagram illustrating how composite components may take advantage of base shadow objects to provide an HTML interface to their construction.

Referring to FIG. 18, the composite components may take advantage of the original BF shadow objects. Instead of creating composite components using JavaScript embedded in the HTML document, the Composite Components may use an HTML interface. Therefore, composite components may be created using JavaScript as follows:
<body onload="initBF(document,0,0);">..<script language="JavaScript1.2" type="text/javascript"><!——BFdate1=new BFDate("date1", "MDY", "1998", "2004", "date1group");//—></script>.

Or, composite components may be created using HTML in the following manner:
<body onload="BF.init( )">..<span id="myDate" BFclass="BFcdate" BFstartyear="1999" BFendyear="2006" BFsubjectgrp="group1" BFFormatType="LONG"BFValue="current"></span>

The latter method may provide a consistent interface for all BF elements as well as easy integration with other BF functionality such as state management observer behavior and context sensitive help.

Some of the new shadow objects include BF Tab, BF Date, BF Time, BF SSN, BF USPhone, BF Accum, BF Item, BF Menu, and BF Tree.

The BF provides a new composite component, named TabWgt. This component displays a tab or notebook control on Web pages. The component manages multiple panes or groups of information, only one of which is visible at a time. On top of each pane is a label. When a label is clicked, its corresponding pane becomes visible. Each pane can also use a common background pane. The <DIV> components in HTML may be positioned and used as panes and labels. The TabWgt component of the BF serves as the "glue" that holds all of the <DIV> components together, and manages the visibility of the active pane.

To create the new TabWgt composite component, a BF class shadow object may be specified with values for the various HTML components that make up the TabWgt:
BF tabbg—value of the BF class attribute for a <DIV> component to be used as the background pane.
BF tabpane—the value of the BF class attribute for a <DIV> component to be used as one of the visible panes.
BF tablabel—the value of the BF class attribute for a <DIV> component to be used as one of the labels at the top or side of the panes; clicking on a label makes the corresponding pane visible and others invisible.

Other attributes that may be specified for HTML components of the TabWgt composite component are:
BF tab—attribute used to identify the HTML components that belong to a specific TabWgt component.
BF default—attribute used to specify which pane will be active (in front) when the page loads; this attribute can be specified on the <DIV> component that has the BF class attribute of BF tabpane or BF tablabel.

You should preferably have as many labels as panes, so the number of <DIV> components that have a BF class value of BF tablabel may match the number of <DIV> components that have a BF class value of BF tabpane.

Figures 5, 6:
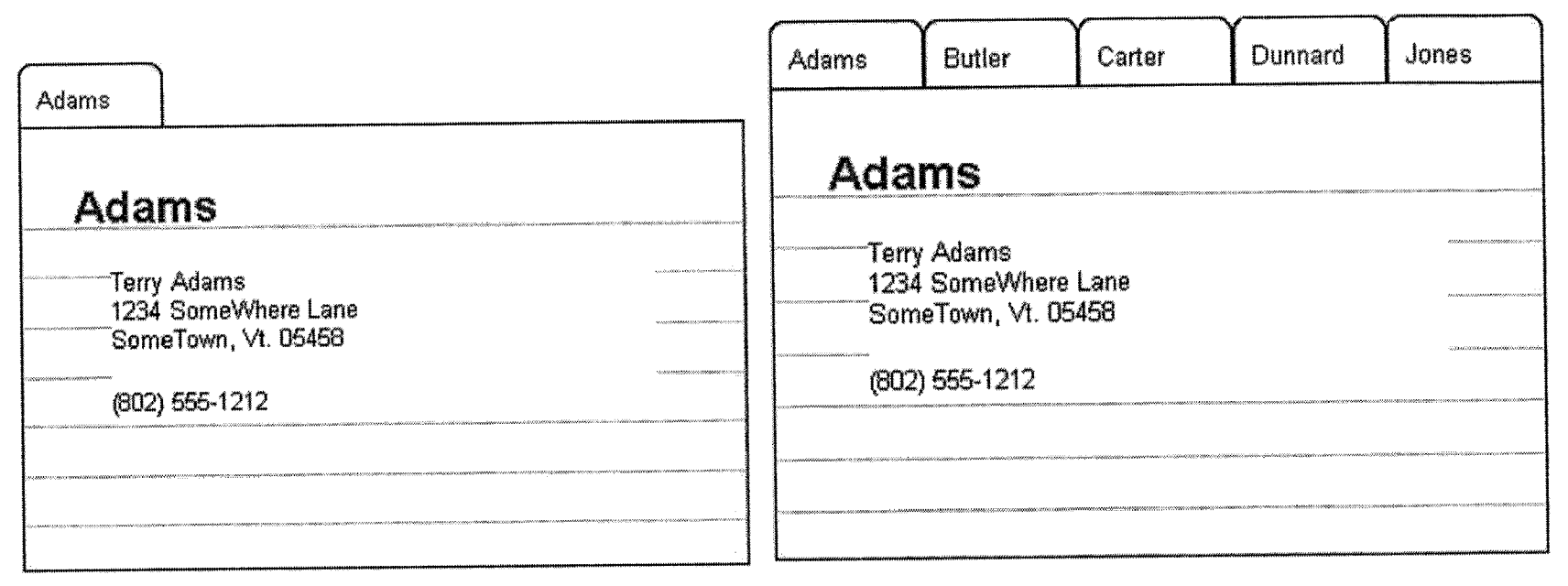

Referring to FIGS. 2–6, three <DIV> components with BF shadow objects: BF tabbg, BF tabpane, and BF tablabel are combined together into a single TabWgt composite component. Referring to FIG. 6, clicking the "Butler" tab will make its corresponding pane visible while making the "Adams" pane invisible.

The BF may further provide functionality to find the application-specified name of a complex tab component; activate a tab upon some pre-defined action; get the index number of the current tab; get/goto the index number of the next/previous tab.

In another embodiment; the BF may provide a composite component named AccumList. This component displays accumulator list boxes (an "available" list and a "selected" list) along with associated push buttons to move entries between the lists. The AccumList is a collection of BF select and BF button objects that are combined to create an accumulator list box widget. The BF may also provide associated methods to use this composite component such as adding items to the list, selecting items from the list, getting selected items from the list, removing items from the list, populating a list with selected items, validating selected items, resetting the list; preparing the selected items for posting to the server; etc.

User selections from one list box or the other cause the push BF buttons to be enabled or disabled:

Add—one or more rows selected in the "available" list box enables Add.

Remove—one or more rows selected in the "selected" list box enables the Remove.

Add All—any items present in "available" enables Add All.

Remove All—any items present in "selected" enables Remove All.

Reset—always enabled—makes each list reset itself to contain its original list of items.

The BF may also provide additional functions may be used to manipulate AccumList components once they are created including: finding the application-specified name of an AccumList; creating the composite accumulator list component; setting the "available" list of option components; setting the "selected" list of option components; examining an array of options; adding new options to an array of "available" items or a specialized array of "selected" items; preparing selected items in list boxes to be posted to a server; resetting the list to "available"/"selected" items to their original state; getting a reference to the array in the "available"/"selected" lists; etc.

The BF Date is a collection of BF Select objects that are combined to create a widget for entering the date. The BF Time is a collection of BF Select objects and radio BF buttons that are combined to create a widget for entering a time. The BF may provide a composite component that can be used to specify a date by manipulating (up to) three <SELECT> components that represent the month, day and year. The BF provides numerous functions that allow both getting and setting the month/day/year/hour/minute/second/AM value/PM value <SELECT> lists created by the date component including constructors and methods for getting the index value or label value of the selected month/day/year/hour/minute/second/AM value/PM value; setting the value of the month/day/year hour/minute/second/AM value/PM value to be selected from the list; populating a JavaScript date/time object with values specified in a BF date component; populating the list boxes in a BF date/time object from values specified in a JavaScript date object; obtaining a reference to the month/day/year <SELECT> component in a BF date component; determining whether the selected year is a leap year; populating a JavaScript Date object from the values selected in a BF time component; and making selections in a BF time component based on the values in a JavaScript date object where the JavaScript date object also contains time information.

The BF USPhone is a collection of BF Text objects that are combined to create a widget for entering an U.S. Phone Number. The BF may also provide a composite component that can be used to specify a 10-digit U.S. telephone number by manipulating three <INPUT> text box components that contain the area code, exchange, and line number parts of the telephone number. The BF provides functions and methods that allow both getting and setting the three parts of a U.S. 10-digit telephone number using the BF telephone number composite component. The methods include creating the telephone number composite component; retrieving the complete 10-digit telephone number displayed the component; retrieving the area code or NPA portion of the telephone number displayed in the component (the first three digits); retrieving the exchange or NXX portion of the telephone number displayed in the component (the second three digits); retrieving the line number portion of the telephone number displayed in the component (the last four digits); retrieving the entire formatted telephone number contained in the component (for example, if the NPA box contains "513", the NXX box contains "675", and the line box contains "3320", this method returns "(513) 675-3320"); setting the value of the area code or NPA portion of the telephone number displayed in the component (the first three digits); setting the value of the exchange or NXX portion of the telephone number displayed in the component (the second three digits); setting the value of the line number portion of the telephone number displayed in the component (the last four digits); and setting the value of the entire 10-digit U.S. telephone number displayed in the component.

The BF SSN is a collection of BF Text objects that are combined to create a widget for entering a social security number. The BF may also provide a composite component that can be used to specify a 9-digit U.S. social security number (SSN) by manipulating three <INPUT> text box components that contain the first three, second two, and last four parts of the SSN. The methods provided may include creating a BF SSN Component; retrieving the 9-digit SSN displayed in the component; retrieving a string containing the displayed 9-digit social security number, formatted with hyphens; specifying the value of the BF text boxes in the BF SSN component.

Style Sheets

For some components, the BF uses style sheets (.css files) to control the appearance and placement of the components on the Web page. The BF's HTML component processing features do not prohibit Web page designers from integrating style sheets with their pages, even though style sheets are an integral part of the BF.

BF's data validation and state management features are designed to change the look and feel of HTML components in response to their validation status. However, these features work correctly regardless of the component's original appearance.

For example, if a style sheet is used independently of the BF to specify that text in an <INPUT> text box should be displayed in size 10 point Arial, this specification will not prevent the BF from detecting whether there is valid text in the box.

Styles can be implemented in a Web page in three ways:

By including a "style=" attribute in the HTML component's tag.

By including a <STYLE> block in the <HEAD> section of the Web page and providing style specifications inside the block for all components on the page.

By including a <LINK> tag in the <HEAD> section of the Web page that "pulls in" a separate .css file; this file contains style sheet specifications for all components on all Web pages that "include" that .css file.

Some BF composite components, such as the menus and the accumulator list box, include specific style specifications based on the component's className attribute value. However, these values may be overridden with user-defined values.

For the BF composite components such as the BF menus, the style sheet specifications define what icon is drawn, how text appears, and also where components display on the Web page.

The style sheets provided by the BF use inheritance to efficiently define when to apply certain style sheet values so that these values do not interfere with other styles. Inheritance means that one object inherits the styles of an object higher in the style hierarchy, and can be further customized.

Modifying BF Styles

Modifying the default BF styles to customize the look and feel of BF—generated objects making changes directly to the default BF tree.css style sheet file or by modifying the contents of another BF style sheet and linking the BF pages to the modified sheet.

Overview of BF Menu Items

In one embodiment, the BF provides six types of menu items used to build menus.

BF RootItem—a required menu item that serves as the root of the menu, but is not visible.

BF HeaderItem—a menu item that is not selectable and cannot have child menu items, but displays text and/or an image at the beginning of the menu.

BF CompositeItem—a menu item that can contain child menu items.

BF SeparatorItem—an item that serves as a separator between menu items (usually a horizontal line).

BF ActionItem—a menu item that performs an action when selected, such as displaying another page in a target window or frame, or executing an application JavaScript function.

BF TrailerItem—a menu item that is not selectable and cannot have child menu items, but displays text and/or an image at the end of the menu.

The BF menu item classes provide only the organizational structure of the application information. Menu objects may be created using these classes and parent-child relationships between menu objects may be specified. Once menu objects are created, another class draws the menu on the page.

BF Menu: This component renders the BF menu item components as a pop-up menu. With a pop-up menu, mousing over a menu item allows a user to display more menu items.

BF Tree: This component renders the BF menu items as a tree menu, in which levels of the menu can be expanded and collapsed. Another feature of this tree menu is the ability to specify that only one child menu path can be expanded at any one time.

BF Menu Item Methods

The BF may also provide several methods for finding information about menu items. These methods include finding the name of an item in a menu; finding the label of an item in a menu; adding child items to other menu items in a menu structure. This method may work for root and composite menu items but may not work for header, trailer, separator, or action menu items; finding the parent menu item of a child menu item. This method may only work after specification of parent-child relationships among menu items; and specifying the name of the frame where the browser should load the URL specified in the action argument of an action menu item.

BF Pop-Up Menu Constructor and Methods

The BF may provide a pop-up menu constructor and some methods to be used after creation of a pop-up menu object. These methods may include its constructor; generating the HTML code that makes the BF pop-up menu component visible on the page; making the pop-up menu component visible; making the pop-up menu component invisible; displaying the pop-up menu component on the page; and getting a reference to the BF shadow object associated with the HTML component that is created by the create ( ) method to display the pop-up menu component on the page.

The BF provides a tree menu constructor and some methods to be used after creation of a tree menu object including a constructor and methods for the tree menu object. These methods include generating the HTML code that makes the BF tree menu component visible on the page; collapsing all the composite items currently expanded in the BF tree menu component; expanding all the composite items in the BF tree menu component; getting a reference to the HTML component that is created to display the tree menu component on the page; and getting a reference to the BF shadow object associated with the HTML component created to display the tree menu component on the page.

BF Menu Style Class Descriptions

When BF menu items are constructed, the styles for these items may be automatically applied to the HTML <DIV> components used to display the menu on the page. These items include menu action items; menu boxes, open/closed composite items; collections or composites of menu items; menu connectors; connector icons; header items; header item icons; icon for the last connector (i.e., an angle); tree tag for the left/right of the menu item and icon thereof; individual menu lines; states of menu items when the mouse is over the item; menu prefixes (i.e., indentations) and icons thereof; tag for the root item of a menu/tree component; menu separators for drawing lines between groupings of objects on a menu; tag for a menu item text area; trailer item for a collection of menu items and icons thereof.

These styles are stored in BF menu.css and/or BF tree.css, depending on whether a developer is building a pop-up or a tree menu. The BF menu style classes are listed and described below.

In addition to the BF style classes, one can add their own class names and styles and use them with BF menu objects. One can do this by adding class names and styles to the HTML code of your page, or by creating their own .css file and linking it to their page.

Setting Styles Based on Class Combinations

When setting up a style sheet, combinations of the class names based on inheritance are used to vary the style of an object based on its type or state. The current Web browsers support only general inheritance, meaning that the second item is some level of "descendent" of the first, and should inherit its styles. Some style sheet combinations include: the BF MenuOpen and the BF MenuConnectorIcon; the BF MenuClosed and the BF MenuConnectorIcon; the BF MenuOpen and BF MenuLastConnectorIcon; BF MenuClosed and BF MenuLastConnectorIcon; BF MenuOpen and BF MenuLeftIcon; BF MeunClosed and BF MenuLeftIcon; BF MenuActionItem and BF MenuConnectorIcon; BF MenuActionItem and BF MenuLastConnectorIcon; BF MenuActionItem and BF MenuLeftIcon; BF MenuOpen and BF MenuRightIcon; BF MenuClosed and BF MenuRightIcon; and BF MenuActionItem and BF MenuRightIcon.

Hierarchical Components

Figure 12:
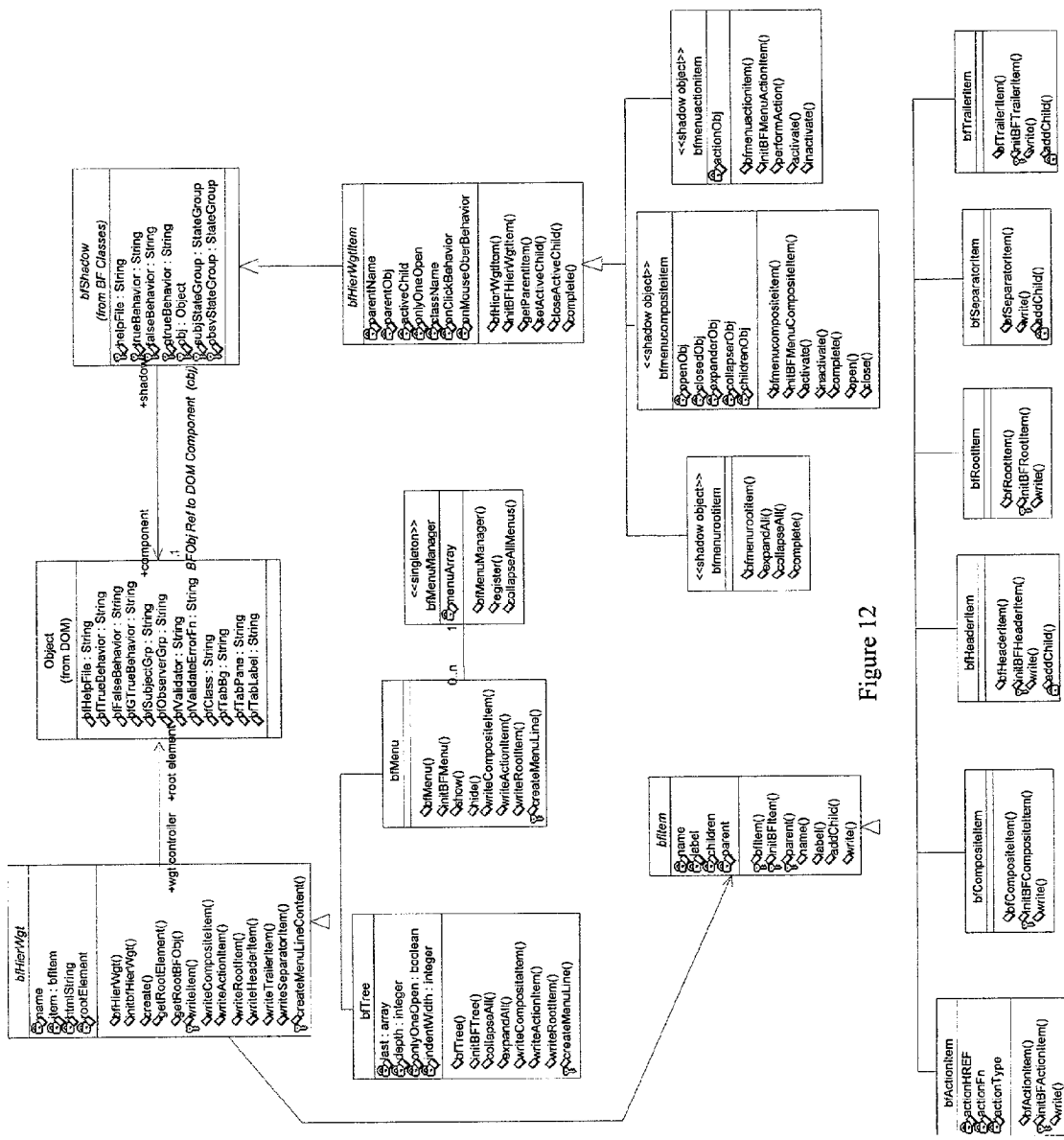
FIG. 12 diagrams the hierarchical subset of the composite components.

Referring to FIG. 12, Hierarchical Components are a specialized version of composite components that are used to visually represent hierarchically organized data structures. The hierarchical components may be broken out into two distinct objects: BF Item, which contains the hierarchical data structure, and BF HierWgt, which determines how the data structure is rendered in the Browser (i.e. a tree or a menu). A concrete specialization of the BF HierWgt is created using a preexisting BF Item. The BF Item is an abstract base class used to define a hierarchical collection of data. The BF HierWgt is an abstract base class used to provide a common method for displaying and controlling hierarchical widgets. The newly created BF HierWgt automatically generates the necessary HTML and writes it into the HTML Document. The generated HTML is written in a manner that takes full advantage of the available BF functionality. The BF HierWgtItem is a specialized derivation of the BF Shadow class that defines the common functionality of hierarchical widget items. BF Item specializations include:

BF ActionItem: The BF ActionItem is a specialized class of the BF Item. It is a leaf type node meaning that it doesn't have any children and may be used to represent data that can perform an action when selected.

BF CompositeItem: The BF CompositeItem is a specialized class of the BF Item. It is a collection of other BF Item objects.

BF HeaderItem: The BF HeaderItem is a specialized class of the BF Item. It is used provide a non-selectable header to a collection BF Items at the same hierarchical level.

BF RootItem: The BF RootItem is a specialized class of the BF Item. It is the base node of the hierarchical data element and is required. Similar to the BF CompositeItem, it is a collection of other BF Item objects.

BF SeparatorItem: The BF SeparatorItem is a specialized class of the BF Item. It is used to represent a logical grouping of data at the same hierarchical level. It is typically displayed as a horizontal line between other items on a menu.

BF TrailerItem: The BF TrailerItem is a specialized class of the BF Item. It is used provide a non-selectable trailer to a collection BF Items at the same hierarchical level.

BF HierWgt specializations include:

BF Menu: The BF Menu is a concrete class of the BF HierWgt. It is displayed as the common menu format where children menus are displayed adjacent to the selected item.

BF MenuManager: The BF MenuManager is a singleton object that keeps track of all of the menus that are created and collapses all of the menus when the user clicks outside of the menus.

BF Tree: The BF Tree is a concrete class of the BF HierWgt. It is displayed as the common tree format that expands and collapses children inline with the other items in the menu.

BF Menuactionitem: The BF menuactionitem is a concrete class of the BF HierWgtItem. It is a shadow object and provides the functionality for performing the action associated with the action item.

BF Menucompositeitem: The BF menucompositeitem is a concrete class of the BF HierWgtItem. It is a shadow object and provides the functionality for displaying submenus.

BF Menurootitem: The BF menurootitem is a concrete class of the BF HierWgtItem.

Other Components of the BF

Browser Independence

New versions of the most popular Web browsers are constantly under development, and these browser versions often support different versions of the Document Object Model (DOM), the Hypertext Markup Language (HTML), Cascading Style Sheets (CSS), and the JavaScript language. In addition, different browser applications (such as Microsoft Internet Explorer and Netscape Navigator) support these standards differently. Rather than continually updating the BF code when new browsers are released, the BF is preferably coded in compliance with the following standards, although any standards may be used:

Document Object Model (DOM) 1.0, Level 1

Hypertext Markup Language (HTML) 4.0

Cascading Style Sheets (CSS2, which also supports CSS1)

JavaScript 1.3

Instead of detecting which browser and browser version are in use, the BF checks for specific functions. If those functions exist in the browser environment, the associated BF code will run. If the functions don't exist, BF checks for other non-standard functions until one is found that does exist, and the appropriate BF code runs. As a result, users of Web pages that contain BF features should preferably use a browser that supports the standards selected:

Tracing

The Trace Functions are used to allow tracing information to be displayed from within JavaScript code. The tracing information displayed is filtered based on the trace level specified on the trace command and the internal trace levels. The level specified on the trace command is bitwise compared to the appropriate internal trace. If a match is found, that level of tracing information is displayed.

Five tracing levels are predefined, but the application can add more levels: 1) function entry and exit, 2) argument values, 3) debug information, 4) detailed debug information and 5) alert window. Tracing can be displayed for BF code, application code, or both. Functions used to trace BF code are:

BF trace (text: String, level: int): Function for writing trace information for the BF. This method should only be used from within the BF.

BF tracein (text: String): Method provided to log BF-based trace messages that trace entry into a BF function. Since the lone argument with this method is the text to be traced, the level will default to FUNC_LEVEL.

BF traceout (text: String): Method provided to log BF-based trace messages that trace exit out of a BF function. Since the lone argument with this method is the text to be traced, the level will default to FUNC_LEVEL.

BF tracearg (label: String, arg: attribute, level: int): Method for writing argument trace information for the BF.

Functions used to trace application code are:

appltrace (text: String, level: int): Function for writing trace information for the application.

appltracein (text: String): Method provided to log application-based trace messages that trace entry into an application function. Since the lone argument with this method is the text to be traced, the level will default to FUNC_LEVEL.

appltraceout (text: String): Method provided to log application-based trace messages that trace exit out of an application function. Since the lone argument with this method is the text to be traced, the level will default to FUNC_LEVEL.

appltracearg (label: String, arg: attribute, level: int): Method for writing argument trace information for the application. This information will be displayed as follows:

BF Math Functions

The BF provides functions that can be used to correct minor mathematical rounding errors that are present, in the JavaScript engine of a given Web browser, including a roundToNPlaces(number, places) function that can be included in Javascript to round a number to a specific number of decimal places and the roundToCents(number) function that can be included in Javascript to round a number to two decimal places.

BF Sniffing Functions

When developing application-specific JavaScripts for a Web pages, it may be necessary to write customized code (or entire pages) for specific browsers, browser versions, operating systems, or platforms. While this is strongly discouraged, sometimes it cannot be avoided.

The BF provides a class named "Sniff", and a pre-created global object instance of this class named "sniff," that may be used to obtain information about the user's system. The BF provides numerous properties for the sniff object to determine the user's browser, version, platform, operating system, and/or system settings.

Stripping Comments

It is good design practice to minimize the size of the JavaScripts put into production. During development, one may want to include a lot of "comment" text as a way of documenting your application JavaScripts, but this text makes scripts larger and slower to download. The BF provides a Perl script which will remove specified types of comments (i.e., C, C++, and/or other programming languages' commenting protocols) in production JavaScript code that is included with a Web page.

CONCLUSION

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A framework embodied on a computer-readable medium for designing a web-based user interface comprising:
   at least one management class associated with a display class;
   wherein said at least one management class is separate from said at least one display class;
   wherein an object instantiated from said at least one management class (management object) is associated with separate object instantiated from said display class (display object) by declaring said management object as an attribute of said display object;
   wherein said management object manages said display object;
   wherein said web-based user interface is developed using said at least one management object and said at least one display object; and
   wherein a set of computer-executable instructions associated with said management object (management object code) executes within a browser associated with a user of said web-based user interface.

2. A framework as claimed in claim 1 wherein said management object code is included as part of a web page when said web page loads into a browser.

3. A framework as claimed in claim 2 wherein said at least one management class comprises at least one subclass.

4. A framework as claimed in claim 2 wherein said display class is associated with a web element's appearance and said management class is associated with a web element's behavior.

5. A framework as claimed in claim 4 wherein:
   at least two management objects are combined to create at least one composite management object; and
   said composite management object is associated with a display object.

6. A framework as claimed in claim 5 wherein said at least one composite management object includes one or more of the following: social security number input; telephone number input; accumulator list box; date input; time input; multiple pane tab control; drop-down menu; pop-up menu; hierarchical component, and tree menu.

7. A framework as claimed in claim 6 wherein said at least one composite management object is created by using JavaScript embedded in the HTML document.

8. A framework as claimed in claim 6 wherein said at least one composite management object is created by using an HTML interface.

9. A framework as claimed in claim 4 wherein said management object code executes within said browser and said management object code is independent of a specific browser type or version.

10. A framework as claimed in claim 9 wherein said management object code queries a web browser specification associated with said browser for a set of functions (browser-specified functions) and executes said management object code via said browser-specified functions.

11. A framework as claimed in claim 10 wherein a set of methods associated with said management object code is designed according to a set of standards.

12. A framework as claimed in claim 11 wherein said set of standards includes Document Object Model, Hypertext Markup Language, Cascading Style Sheets, and JavaScript.

13. A framework as claimed in claim 4 wherein said at least one management class comprises at least one abstract superclass.

14. A framework as claimed in claim 13 wherein a set of subclasses are derived from said at least one abstract superclass to provide management functionality for a set of respective HTML elements.

15. A framework as claimed in claim 14 wherein an additional subclass may be derived from said abstract superclass to extend said framework to provide functionality for an additional HTML element.

16. A framework as claimed in claim 13 wherein an additional subclass may be derived from said abstract superclass to customize said framework to provide additional functionality for said set of respective HTML elements.

17. A framework as claimed in claim 4 wherein said management classes are designed to manage a set of display objects associated with a web-based customer care user interface.

18. A framework as claimed in claim 4 wherein said management classes are designed to manage a display object associated with a web-based call center user interface.

19. A framework as claimed in claim 4 wherein said management object is implemented with a set of methods and attributes for the design of a web-based customer-care interface.

20. A framework as claimed in claim 4 wherein said management object is implemented with a set of methods and attributes for the design of a web-based call-center interface.

21. A framework as claimed in claim 4 wherein said display object comprises an HTML element.

22. A framework as claimed in claim 21 wherein said display object includes one or more of the following elements: window, navigator, event, collection, document, form, input, select, label, background, foreground, pane, tab, option, textarea, table, DIV, tablerow, tablecell, anchor, image, frameset, and frame.

23. A framework as claimed in claim 22 wherein said input comprises one or more of the following input elements: buttons, checkboxes, files, hidden, image, password, radio buttons, resets, submits, and text entries.

24. A framework as claimed in claim 4 wherein said management object is associated with said display object by defining said management object as an attribute of said display object.

25. A framework as claimed in claim 4 wherein said management object manages at least one validation function for said display object.

26. A framework as claimed in claim 25 wherein said at least one validation function includes one or more of the following: credit verification, address verification, and identity verification.

27. A framework as claimed in claim 4 wherein said management object manages at least one masking function for said display object.

28. A framework as claimed in claim 4 wherein said management object manages at least one state management function for said display object.

29. A framework as claimed in claim 4 wherein said management object implements a help function for said display object.

30. A framework as claimed in claim 4 further comprising at least one tracing mechanism; at least one DOM component searching mechanism; at least one math rounding feature; at least one sniffing function; at least one comment stripping function; and at least one cookie function.

31. A framework as claimed in claim 4 wherein said management class and said display class are related through a common superclass.

32. A method for creating web-based user interfaces comprising:
utilizing a framework encoded on a computer readable medium wherein said framework comprises at least one management class that is separate from a class associated with a respective display object;
instantiating at least one object from said management class (management object);
associating said at least one management object with said respective display object by declaring said management object as an attribute of said respective display object;
creating a web-based user interface wherein said management object manages said display object by executing a set of programming instructions associated with said management object within a browser associated with a user of said web-based user interface.

33. A method for creating client-side user interfaces comprising:
separating at least one web component into a display component and a management component;
designing a set of classes (framework) comprising at least one display class and at least one separate management class;
associating said at least one display class with said at least one management class through a common superclass;
implementing at least one method and at least one attribute through said management class;
instantiating an object from said management class (management object);
instantiating separate object from said display class (display object);
associating said management object with said display object by declaring said management object as an attribute of said display object;
designing a client-side user interface with said at least one set of associated management and display objects.

34. A method for creating client-side user interfaces comprising the steps of:
providing a framework wherein said framework provides a set of management objects to manage the behavior of a web-based component
composing a separate display object and declaring at least one of said set of management objects as an attribute of said display object;
executing a set of computer executable instructions associated with said management object within a browser associated with a user of said client-side user interface.

35. A method for creating client-side user interfaces as claimed in claim 34 further comprising the steps of extending said set of management objects to include one or more of the following advanced management objects: a composite component, a validator component, and a hierarchical component.

36. A method for creating web-based user interfaces comprising the steps of:
designing a web-based user interface according to a framework wherein said framework provides a set of management objects which manage a set of behavior associated with a set of web-based components associated with a web-based user-interface;
allowing a user to request said web-based user interface from a server wherein a set of computer executable instructions associated with said web-based user interface comprises the steps of:
creating a set of display objects;
creating a separate set of management objects;
associating said management objects with said set of display objects by declaring said management objects as attributes of said display objects;
loading a set of computer executable instructions associated with said management objects in a browser associated with said user;

manipulating said display objects via said management objects within said browser in response a user action in said web-based user interface.

37. A framework embodied on a computer-readable medium for designing a web-based user interface comprising:
   means for displaying a web element;
   separate means for managing a behavior associated with said web element; and
   associating said means for managing with said means for displaying by declaring said means for managing as an attribute of said means for displaying;
   wherein said means for managing said behavior executes within a client-side computer means in response to a user's manipulation of said web element.

38. A framework as claimed in claim 37 wherein said means for managing said behavior includes accessing a server.

39. A framework embodied on a computer-readable medium for designing a web-based user interface comprising a set of management classes:
   wherein each management class within said set is respectively designed to manage a specific type of web element;
   wherein an object instantiated from said management class (management object) is associated with a respective web element;
   wherein said management class does not derive from a class associated with said web element;
   wherein said management object is associated with a separate object instantiated from a separate display class (display object) by declaring said management object as an attribute of said display object;
   wherein said management object manages said display object;
   wherein said web-based user interface is developed using said set of management objects along with their respective web elements; and
   wherein a set of computer-executable instructions associated with said management object (management object code) executes within a browser associated with a user of said web-based user interface when said user manipulates said web elements.

* * * * *

UNITED STATES PATENT AND TRADEMARK OFFICE
CERTIFICATE OF CORRECTION

PATENT NO.         : 6,973,625 B1
APPLICATION NO. : 10/127042
DATED                  : December 6, 2005
INVENTOR(S)       : Joseph Paul Lupo et al.

It is certified that error appears in the above-identified patent and that said Letters Patent is hereby corrected as shown below:

At column 2, line 29, immediately after the word "related", please insert the word "to".

At column 3, line 2, please delete the text "t.asp?url=/worksbop/author/om/doc_object.asp.", and replace with --t.asp?url=/workshop/author/om/doc_object.asp.--.

At column 5, line 54, please delete the word "farther" and replace with --further--.

At column 7, line 10, immediately after the word "be", please insert, --independent of a specific browser type or version. This may be achieved by designing the management object code to query a web browser specification (a document or file that may be parsed to determine how the web browser operates and may be interfaced by other programs) associated with said browser for a set of functions (browser-specified functions) and to execute said management object code via said browser-specified functions. The management object code may be further designed according to a set of standards. These standards may include Document Object Model, Hypertext Markup Language, Cascading Style Sheets, JavaScript and other web-based/user-defined standards.

In another embodiment, said management class may comprise at least one abstract superclass. A set of subclasses may be derived from the at least one abstract superclass to provide management functionality for a set of respective HTML elements. An additional subclass may be derived from said abstract superclass to extend said framework to provide functionality for an additional HTML element. Alternatively or in combination, the additional subclass may be derived from said abstract superclass to customize said framework to provide additional functionality for said set of respective HTML elements.

In another embodiment, the management classes may be designed to manage a set of display objects associated with a web-based customer care user interface and/or a web-based call center user interface. A customer care user interface is an interface designed for the use of a customer end user to allow them to obtain information about a company or issues concerning their account. Customer care websites may also include contemporary text chat with a customer service representative through the website. A call center user interface is..."

UNITED STATES PATENT AND TRADEMARK OFFICE
CERTIFICATE OF CORRECTION

PATENT NO.       : 6,973,625 B1
APPLICATION NO.  : 10/127042
DATED            : December 6, 2005
INVENTOR(S)      : Joseph Paul Lupo et al.

It is certified that error appears in the above-identified patent and that said Letters Patent is hereby corrected as shown below:

At column 8, line 65, immediately after the word "interface", please place a period.

At column 8, line 65, please delete text beginning with "independent", and continuing through column 9, line 31 ending with the word "is".

At column 9, line 67, immediately after the word "DOM", please place a period.

At column 10, line 2, immediately after the word "validation", please place a period.

At column 10, line 66, please delete "clients", and replace with --client's--.

At column 13, line 32, immediately after "...true behavior attribute", please place a semi-colon.

At column 13, line 61, immediately after the word "component", please place a right parenthesis.

At column 21, line 1, please delete the word "MeunClosed", and replace with --MenuClosed--.

At column 24, line 5, immediately after the word "with", please insert the word --a--.

At column 26, line 25, immediately after the word "instantiating", please insert the word --a--.

UNITED STATES PATENT AND TRADEMARK OFFICE
CERTIFICATE OF CORRECTION

PATENT NO. : 6,973,625 B1
APPLICATION NO. : 10/127042
DATED : December 6, 2005
INVENTOR(S) : Joseph Paul Lupo et al.

It is certified that error appears in the above-identified patent and that said Letters Patent is hereby corrected as shown below:

At column 26, line 36, immediately after the word "component", please insert a semi-colon.

At column 27, line 2, immediately after the word "response", please insert the word --to--.

Signed and Sealed this

Fifteenth Day of January, 2008

JON W. DUDAS
*Director of the United States Patent and Trademark Office*